US012563102B2

(12) United States Patent
Golden et al.

(10) Patent No.: US 12,563,102 B2
(45) Date of Patent: Feb. 24, 2026

(54) DYNAMIC ATTRIBUTE BASED EDGE-DEPLOYED SECURITY

(71) Applicant: Rockwell Automation Technologies, Inc., Mayfield Heights, OH (US)

(72) Inventors: Diane E. Golden, West Allis, WI (US); Michael J. Anthony, Milwaukee, WI (US); Blake S. Johnson, Bellevue, WA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 80 days.

(21) Appl. No.: 18/606,514

(22) Filed: Mar. 15, 2024

(65) Prior Publication Data

US 2025/0294057 A1     Sep. 18, 2025

(51) Int. Cl.
*H04L 29/06*          (2006.01)
*H04L 9/40*           (2022.01)
*H04L 41/16*          (2022.01)

(52) U.S. Cl.
CPC .............. *H04L 63/20* (2013.01); *H04L 41/16* (2013.01); *H04L 63/102* (2013.01)

(58) Field of Classification Search
CPC ..... H04L 63/20; H04L 63/10; H04L 63/0263; H04L 63/166; H04L 63/102
See application file for complete search history.

(56) References Cited

U.S. PATENT DOCUMENTS

| | | | | |
|---|---|---|---|---|
| 11,411,927 | B2 * | 8/2022 | Zhao ....................... | H04L 63/04 |
| 2023/0308853 | A1 * | 9/2023 | Ding ....................... | H04W 4/40 |
| 2024/0028009 | A1 * | 1/2024 | Mirth .................. | H04L 63/1433 |
| 2024/0187071 | A1 * | 6/2024 | Li .......................... | H04W 24/10 |

* cited by examiner

*Primary Examiner* — Longbit Chai

(57) ABSTRACT

Dynamic attribute-based edge-deployed security in an industrial automation environment is described. A policy engine receives a command executable relevant to operational technology of an industrial automation environment via an access account. The policy engine classifies the command as approved or denied based on identifying a security policy based on the access account and operational technology, determining a set of parameter values based on the security policy, determining an intent of the command based on the set of parameter values, and classifying the command by evaluating the intent against the security policy. In response to command approval, the policy engine identifies a first communication channel coupling the operational technology and a policy enforcement point, connects a second communication channel coupling the policy enforcement point and the policy engine, and transmits the command and an indication of the first channel to the policy enforcement point via the second channel.

20 Claims, 10 Drawing Sheets

100

350

400

500

700

702    Network Security System Communication Portal

726

704    Access Account/Credential Logged In

706    Stephanie P.

708    Command History for Access Account

01:16:00 PM: Conveyor 1 set to perform task - Approved
01:16:00 PM: Conveyor 2 set to perform task - Approved

710

712    Current Operational Technology Status

Conveyor 1: performing task, operating as anticipated
Conveyor 2: performing task, operating as anticipated

714

Type Command Below
Click "Go" to Submit Command
716    Click "Simulate" to View Expected Outcome of Command

*Stop conveyor 1 for repairs.*

718

Go        Simulate 722                                    720

724    Expected Outcome Upon Entry of Command Above

01:16:00 PM: Conveyor 1 halted for repair, operating as anticipated
01:16:00 PM: Conveyor 2  performing task, operating as anticipated

| COMPUTING SYSTEM | 905 |
| --- | --- |

| STORAGE SYSTEM | 910 |
| --- | --- |

| SOFTWARE | 915 |
| --- | --- |

| Policy Engine | |
| --- | --- |
| | 106 |

| COMM. I/F SYS. | PROCESSING SYSTEM | USER. I/F SYS. |
| --- | --- | --- |
| 920 | 925 | 930 |

DYNAMIC ATTRIBUTE BASED EDGE-DEPLOYED SECURITY

TECHNICAL FIELD

Various embodiments of the present technology generally relate to network security systems in industrial automation environments and more specifically to network security systems that identify intent and use security policies in view of the intent to dynamically control communication channels for communication between devices in an industrial automation environment.

BACKGROUND

Industrial automation technology is continuously improving and becoming increasingly complex. As the complexity of the industrial automation systems increases, network security considerations for those systems also increase.

Industrial automation environments use networked machinery, devices, and control systems to execute tasks that may otherwise be performed by humans. Network security in these industrial automation environments protect data from unauthorized access as well as devices and humans in the environment from physical harm. To maintain security in these systems, network security systems (NSSs) manage the industrial automation devices and associated systems. A NSS may utilize hardware, firmware, software, configurations, and procedures to protect a network against unauthorized access or unintended use. Protecting the data and communication systems of an industrial automation environments with a NSS limits some degree of unauthorized access and unintended use, but existing technologies are not complete solutions to these problems.

Where an industrial automation environment continuously maintains connected communication channels with its various automation devices and associated systems, those channels represent continuously maintained targets for infiltration or misuse. However, the communication channels are needed to transmit communications between devices, even in the most security cautious environments.

Accordingly, improvements to industrial automation environment network security systems are needed to avoid misuse of continuously connected communication channels between industrial automation devices.

SUMMARY

This Summary is provided to introduce a selection of concepts in a simplified form that are further described below in the Detailed Description. While multiple embodiments are disclosed, still other embodiments of the present technology will become apparent to those skilled in the art from the following detailed description, which shows and describes illustrative embodiments of the invention. As will be realized, the technology is capable of modifications in various aspects, all without departing from the scope of the present invention. Accordingly, the drawings and detailed description are to be regarded as illustrative in nature and not restrictive.

Systems and methods are provided herein for implementing various network security systems (NSS) of an industrial automation environment. Additionally, the following description provides details of implementing dynamic edge-deployed updates to a security policy of an industrial automation environment.

The methods and systems for network security systems disclosed herein reduce the extent of unnecessary communication channels connected during the execution of a given command. An access account on an edge computing device generates a command that is relevant to an operational technology in an industrial automation environment. The command is intercepted by the NSS, which authenticates the relevant access account. A policy engine is used to classify the command as approved or denied. If approved, the policy engine determines which communication channels to connect to transmit the command to the relevant operational technology. The policy engine generates a second command including the command and an indication of the communication channels, connects a communication channel between the policy engine and a policy enforcement point, and transmits the second command over the newly connected communication channel to the policy enforcement point. The policy enforcement point uses the second command to connect the communication channels between it and the operational technology and transmit the command or other relevant data to the operational technology. Once complete, all communication channels connected relevant to the command are disconnected.

By evaluating at least the command and credentials associated with the access account, the policy engine determines which operational technology or technologies are relevant for the execution of an approved command. The inclusion of substantial specificity about the nature of the command allows the policy engine to isolate the appropriate operational technology for communication as necessary as opposed to interacting with entire classes, or otherwise inflexible predefined subgroups, of operational technologies. Further, the policy engine can dynamically create a path for the communication channel. The dynamic creation of a path provides variability into the process to help ensure that the same communication channel is not always used to communicate with given operational technology. This variability adds another dimension to thwart attacks. In an example where the same communication channel path is always used and is used often, the same issues of constantly connected communication paths reemerge. However, dynamically generating random paths for communication channels can help avoid that issue.

In some embodiments, the default state of the communication network between operational technology and between operational technology and other devices in the industrial automation environment is that the communication channels are disconnected by default and connected by the policy enforcement point.

In some embodiments, where a command takes the form of a natural language instruction, a natural language processing model of the intermediary interprets the command to extract command information and sends the command information to the policy engine.

In some embodiments, the operational technology of the industrial automation environment is made up of multiple instances of operational technology. In an embodiment where numerous operational technologies of differing types are present in an industrial automation environment, the policy engine selects only those relevant for the execution of an approved command to connect communication channels. In other words, each relevant operational technology is analyzed with respect to the command to determine if the command is approved or denied with respect to each operational technology. For operational technology that is approved, a communication path is identified and included in the command from the policy agent to the policy enforcement point for the policy enforcement point to connect. For operational technology that is denied, no paths for communication channels are included.

In some embodiments, the attributes (i.e., parameter values) used by the policy engine to determine an intent of the command include an identity of a user associated with the access account, a role of the user, a location of the user, a current activity of the user, a preceding activity of the user, a historical record of activity of the user, an identity of a system associated with the access account, a role of the system, a time of the command to be executed, a date of the command to be executed, a nature of the command to be executed, or a combination thereof.

In some embodiments, determination of the intent of the command is performed by an artificial intelligence system. In response to being fed an input that includes the command to be executed on the operational technology and the set of parameter values determined by the policy engine, the artificial intelligence system evaluates the input and generates an output indicating the intent of the command.

In some embodiments, the command may include an operation for execution by the operational technology. In some embodiments, the command may include modification of a security policy relevant to the operational technology.

In some embodiments, the communication channel between the policy enforcement point and the operational technology is disconnected in response to acknowledgement of reception of the command from the policy enforcement point to the operational technology, or upon expiration of a predetermined time delay. In some embodiments, the communication channel between the policy agent and the policy enforcement point is disconnected in response to acknowledgement of reception of the message from the policy agent to the policy enforcement point, acknowledgement of reception of the message from the policy enforcement point to the operational technology, acknowledgement of successful execution of the command by the operational technology, or upon expiration of a predetermined time delay.

In some embodiments, the policy engine dynamically generates a path for the communication channel connection between the policy enforcement point of an industrial automation environment and the operational technology. In such embodiments, various paths may be used and dynamically shifted between multiple paths based on predetermined time intervals or triggering events. In some embodiments, differing paths may be selected to avoid paths that are otherwise being used by other operational technology communications.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 7 illustrates a user interface used in some embodiments of the present technology.

DETAILED DESCRIPTION

Figure 1:
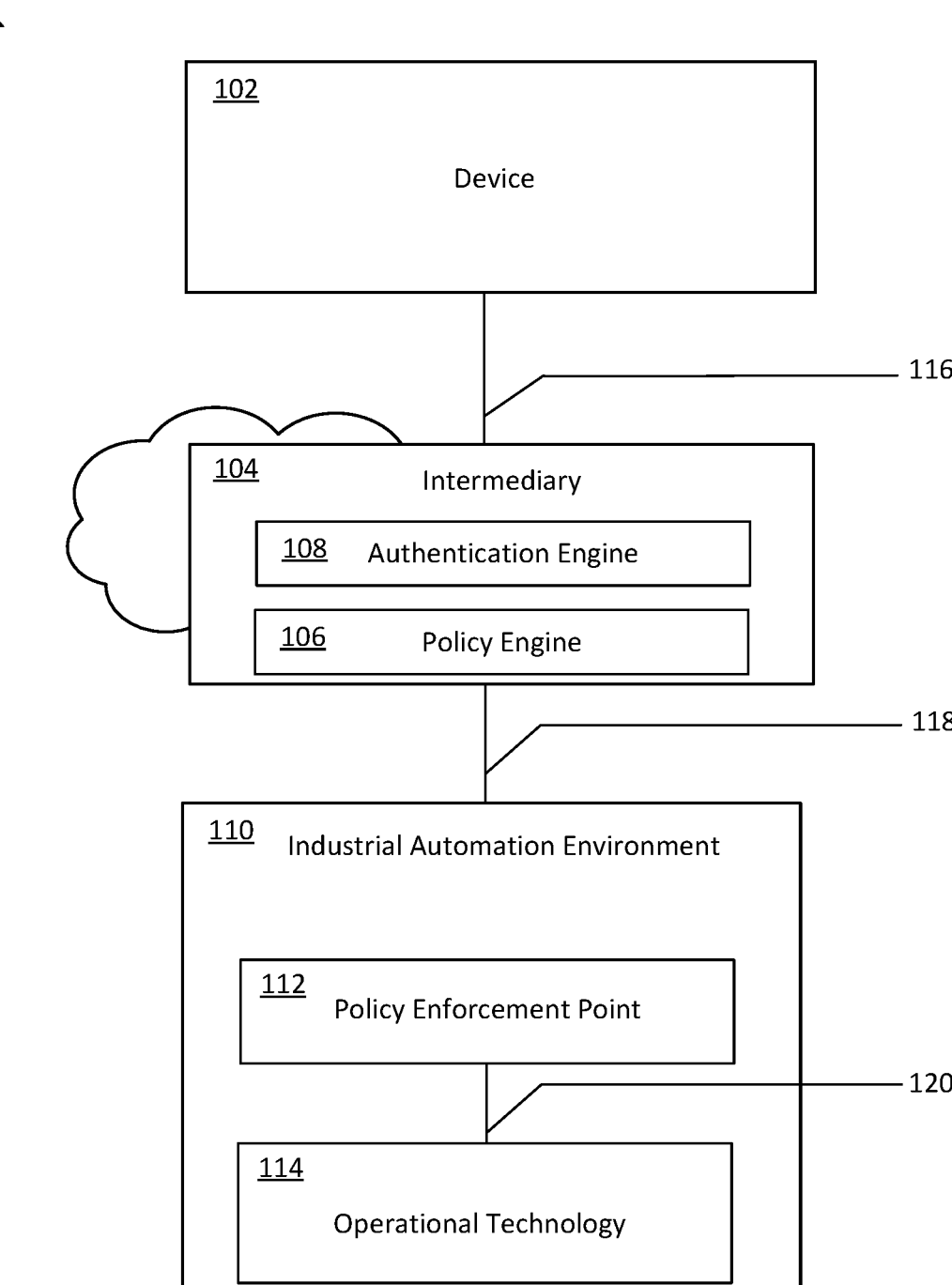
FIG. 1 illustrates a system including a network security system of an industrial automation environment, in accordance with embodiments of the present technology.

As described above, various embodiments of the present technology generally relate to network security systems of industrial automation environments. Current network security systems of industrial automation environments are not equipped to dynamically classify and evaluate an intent of a command as a means to dynamically connect and disconnect communication channels while minimizing the amount of unnecessary communication channels. As a result, current network security systems of industrial automation environments continue to experience challenges that hinder efficiency, diminish security, or both.

As discussed herein, a communication channel that is "connected" is instantiated and prepared to facilitate communication, and a communication channel that is "disconnected" is not capable of facilitating communication between its end points. Additionally, where two devices of the disclosed system are "coupled," they are joined by a communication channel that may be "connected" or "disconnected." Accordingly, if the communication channel coupling the two devices is "connected," the communication channel can facilitate communication between the two devices.

The intent behind a command is one means to evaluate the validity of the command, so the intent can add greater context to security analysis for the command. The intent could be legitimate and to further the objectives of the enterprise operating the industrial automation environment. Even where the intent is legitimate, mistakes or oversights may still occur. In this scenario, the technology disclosed herein advantageously gathers enough context from about the access account, the command, and operational technology to protect an industrial automation environment against well-intentioned but problematic modifications to security policies or system configurations (e.g., disallow machine shutdown if expected cascading impacts are unsafe, trigger transition to safe state automatically). In contrast, the intent could be illegitimate. Here, a command will generally be denied, preserving the function of the industrial automation environment. As described in further detail below, information about the request including the contextual information, intent of the request, and the like is used by the NSS to determine the legitimacy of the request in a manner similar to security personnel to avoid compromising security.

In an embodiment of the present technology, a command is generated relevant to an operational technology of an industrial automation environment. For example, a user may generate and enter the command into a user interface upon gaining access to the system using an access account. The access account may also be referred to as a user account, a credential, or the like in some example descriptions. While the term user account may be used herein, other non-human actors (e.g., systems, other industrial automation devices, and the like) may use access accounts (e.g., user accounts) to authenticate and initiate commands in the industrial automation environment. Accordingly, a credential, an access account, a user account, or the like may be used interchangeably throughout to indicate any authenticated access. Further, while the term "user" may be used in some explanations, a user may be a human, a device, a system, or any other non-human actor.

Returning to the example, the user interface could be rendered by a physical computer, a cloud computing device, or a terminal on the premises of an industrial automation environment, among other examples. The command may also be executable against or relevant to more than one operational technology in the industrial automation environment. Operational technology can be any component used in an industrial automation environment including physical devices and software. In some embodiments, the command may be a security policy configuration, a command for execution by the operational technology of an industrial automation environment, or any other type of command relevant to an industrial automation environment. The command could take the form of an executable instruction that could be enacted by a processor upon reception, a natural language instruction requiring interpretation to be carried out, or any other suitable means of conveying a directive relevant to operational technology in an industrial automation environment.

An intermediary intercepts the command before it is transmitted to the industrial automation environment. The intermediary includes an authentication engine that authenticates the access account by which the command is sent to the industrial automation environment. In some embodiments, a policy engine is also resident on the intermediary. In other embodiments, the policy engine is resident on a server within the industrial automation environment. In either case, after authentication of the access account, the policy engine receives the command and classifies the command as either approved or denied. To classify the command, the policy engine first evaluates the access account associated with the command and the operational technology the command is relevant to (e.g., executed against, for execution by, or the like) to identify a security policy of the policy engine relevant to the command. As previously discussed, in some examples, an access account is associated with a person. The credentials associated with that access account can be used to evaluate a degree of authority for that person. In other examples, an access account may be associated with a system account, a device, an application, a third-party integration, or the like. Non-human access accounts (sometimes termed service accounts) that are utilized for software process-to-process communication (for example, control server to historian and programmable logic controller to control server) may require different security policies and procedures from human access accounts. In such examples, the identity and credentials associated with an access account are not the identity or credentials of a person, but rather the identity and credentials of a system account, system process, third-party integration, or the like (i.e., a non-human actor). In a similar fashion to how the credentials of a person associated with an access account is utilized to determine authority to execute commands, credentials for access accounts associated with a non-human actor rely on the degree of authority granted to that non-human actor. Where, for example, an access account associated with a third-party integration, such as a cloud-service API, requires access to a particular database to function as intended, the credentials for the third-party integration are used to evaluate the authority of the access account and, in part, to determine the intent regarding the command. In another example, a device may require access to another device to deliver a message containing a preprogrammed instruction. Accordingly, the credentials associated with the access account to the device are used to determine whether the device has the authority to deliver the message to the other device.

Other criteria could also be evaluated in addition to access account credentials and operational technology associated with a command to identify the security policy to be applied. The policy engine uses the identified security policy to determine a set of parameter values for the command. The policy engine uses the set of parameter values to evaluate an intent of the command. The policy engine weighs the intent of the command against the identified security policy to apply a classification to the command. Additional means for evaluating the intent of a command via the output of an artificial intelligence system are disclosed herein.

In response to a command classified as denied, the policy engine blocks the command from being transmitted for execution in the industrial automation environment by not connecting a communication channel to a policy enforcement point of the industrial automation environment. The classification of a previous command as denied may act as a subsequent parameter value in a later intent determination for a future command from the same access account. The intermediary may also further investigate the denial by generating audits on the source of the denied command.

In response to a command being classified as approved, the policy engine identifies a first communication channel to connect between the policy enforcement point of the industrial automation environment and the operational technology relevant to the command and a second communication channel between the policy engine and the policy enforcement point of the industrial automation environment. The second communication channel is connected and the command and an indication of the first communication channel to be connected are transmitted along the second communication channel to the policy enforcement point. Upon transmission of the command and indication of the first communication channel to the policy enforcement point, the second communication channel may be disconnected. Closing the second communication channel could be in response to other events, such as receiving an acknowledgement from the policy enforcement point, receiving acknowledgement from the operational technology, upon expiration of a predetermined time delay, or any other suitable trigger.

Advantageously, the methods and system for network security disclosed herein greatly reduce exposure from unnecessarily continuously connected communication channels because the communication channels are connected dynamically as needed for executing the command. By evaluating factors, including the command and associated credentials of the access account, the policy engine determines which instances of operational technology are relevant for the execution of an approved command and only connects communication channels needed for command execution. Further, the paths used for the communication channels can dynamically change. Dynamically modifying paths such that the same path is not used every time generates randomness within the network to help thwart attempts at misuse of open communication channels. Dynamically modifying paths may further increase network efficiency because the policy engine may identify a path that is being used for a critical command and, in response, use a different path for another command to avoid having the commands impact each other. Avoiding network bandwidth issues with dynamic paths for the communication channels further improves resource efficiency in the endpoint devices.

In some embodiments, the command is provided as a natural language instruction. Where a command takes the form of a natural language instruction, a natural language processing model is used to interpret the command to extract command information and send the command information to the policy engine. The policy engine uses the command information along with the credentials for the access account associated with the command to identify a security policy. Once the security policy is identified, the policy engine classifies the command as described throughout.

In some embodiments, the parameters used to determine the intent of a command include, but are not limited to, credentials of a user associated with the access account, credentials of the access account, a role of the user, a location of the user, a current activity of the user, a preceding activity of the user, a historical record of user activity, a time of the command to be executed, a date of the command to be executed, a nature of the command to be executed, or a combination thereof. These parameters are used to aid in determining the intent of a command by adding greater context to the command such that the policy engine is given a greater amount of detail when evaluating the intent of the command against the security policy. Take, for example, a command that is otherwise deemed appropriate and is classified as approved but originates in a foreign country where no approved users are located. Here, an additional parameter for a location of the user advantageously adds context to the evaluation of the intent of the command and may result in a change of command classification from approved to denied that would not have otherwise been made without the extra context.

In another embodiment, determination of the intent of the command is performed by an artificial intelligence system. Upon being fed an input that includes the command to be executed on the operational technology and the set of parameter values determined by the policy engine, the artificial intelligence system evaluates the input and generates an output indicating the intent of the command. The artificial intelligence system can be trained on known combinations of commands and intents of those commands to increase the accuracy of its output. Training an artificial intelligence system can be performed by adjusting the internal values of the artificial intelligence system with regard to known input and output pairs, or by user adjustment of outputs versus the input that generated those outputs, among other techniques.

Turning now to the figures, FIG. 1 includes system 100. System 100 is configured to protect its constituent components against unauthorized access or unintended use. System 100 includes device 102, intermediary 104, and industrial automation environment 110. System 100 may include more or fewer components than are depicted here for ease of discussion.

Figure 9:
FIG. 9 illustrates an example computing system, in accordance with embodiments of the present technology.

Device 102 may be any computing device having components allowing communication on a network and particularly that can communicate with intermediary 104, of which general computing device 900 of FIG. 9 is broadly representative. While device 102 is depicted represents a single device, system 100 may include any number of devices similar to device 102. Further, device 102 may be a distributed computing system. Device 102 may be a personal computing device in use off premises, a personal computing device in use on premises, a cloud computing device, or a dedicated terminal in an industrial automation environment, among other examples. Device 102 may be used to access a user interface such as user interface 700 depicted and described with respect to FIG. 7. In one example, device 102 is a personal laptop used by a technician on the premises of an industrial automation environment like industrial automation environment 110. In another example, device 102 is a personal desktop computer used in a remote office by a remote administrator responsible for the management of an industrial automation environment like industrial automation environment 110. In some examples, device 102 is a non-human actor as discussed herein. For example, device 102 may be an operational technology such as operational technology 114. Despite being within industrial automation environment 110, commands issuing from within industrial automation environment 110 may still be directed externally to be intercepted by intermediary 104 for analysis according to the present disclosure. Additionally, other applications, systems, or the like may utilize an access account and be representative of device 102 that issues a command that is intercepted by intermediary 104 over communication path 116.

Intermediary 104, as depicted, is implemented in a cloud-based system. In some embodiments, intermediary 104 may be deployed on the premises of industrial automation environment 110. Intermediary 104 may include policy engine 106. As depicted in other embodiments, policy engine 106 may reside within industrial automation environment 110 rather than in intermediary 104. Intermediary 104 also includes authentication engine 108. Intermediary 104 is configured to intercept a command directed to industrial automation environment 110. Intermediary 104 may further contain applications, interfaces, storage, and various databases, which are not depicted for clarity. Intermediary 104 communicates with device 102 via link 116. Intermediary 104 may be hosted on servers, in a data center, in a distributed manner, or the like. In some embodiments, intermediary 104 may be hosted on one or more servers on the premises of industrial automation environment 110.

Link 116 may be part of a local area network (LAN), a cloud-based network, or any other sufficient means of network communication that can be connected and disconnected. By default, link 116 is configured to allow the transmission of messages between device 102 and intermediary 104 independently of any security analysis. A default state is one that a system enters into once activated without requiring any input or initialization. Other embodiments of the technology may require the default application of various security protocols to the transmission of messages between device 102 and intermediary 104. In an example where device 102 is a personal laptop used by a technician on the premises of an industrial automation environment, link 116 may include some wired communication componentry. In another example where device 102 is personal desktop computer used in a remote office by a remote administrator responsible for the management of an industrial automation environment, link 116 may be entirely wireless communication.

Intermediary 104 communicates with industrial automation environment 110 via second communication channel 118. Second communication channel 118 may be part of a local area network (LAN), a cloud-based network, or any other sufficient means of network communication that can be connected and disconnected. By default, second communication channel 118 is configured to be disconnected such that messages cannot be transmitted between intermediary 104 and industrial automation environment 110 prior to satisfaction of one or more relevant security policy. Some embodiments of the disclosed technology are zero-trust environments while other examples may involve some degree of trust. Trust in a network security environment refers to the extent communications may be sent and received on the network in relation to the extent security validation is performed. A zero-trust network example would not allow any communication between its constituents prior to some degree of verification, while a low-trust network example may allow some communication to occur prior to security validation. Many industrial environments are low-trust or zero-trust, making the deployment of commands secure but cumbersome. Beneficially, system 100 promotes increased efficiency in zero-trust environments by intelligently automating stages of the security policy enforcement process, including the command interpretation stage, the security policy identification stage, and the security policy application stage.

Policy engine 106 provides functionality for classifying the commands issuing from device 102 as approved or denied. Policy engine 106 may be implemented in hardware, software, firmware, or a combination thereof. Policy engine 106 is described in detail below in the associated text of FIG. 2. In some embodiments, policy engine 106 may be distributed over multiple computing or storage devices. In some embodiments, policy engine 106 may be located on the premises of an industrial automation environment or may be housed in remote storage locations. In collaboration with other elements of intermediary 104, pictured in FIG. 2 in greater detail, policy engine 106 processes commands generated by device 102 and classifies the commands. Command processing by policy engine 106 may include natural language processing, security policy identification, parameter set identification, parameter value assessment, intent determination, command classification, channel identification, or a combination thereof.

Authentication engine 108 provides functionality for authenticating an access account used to issue commands from device 102. For example, the access accounts may be associated with users or non-human actors, and may have various credentials, roles, and authority granted. Authentication engine 108 analyzes the access account and evidence of the validity of the account (e.g., username and password) to allow or deny access for submitting commands. Authentication is not described in detail herein as authentication for allowing access is known in the art.

Industrial automation environment 110 may include policy enforcement point 112 and operational technology 114. Industrial automation environment 110 is broadly representative of any factory environment utilizing automation technology and may include one or more physical locations. For example, industrial automation environment 110 may be an automotive assembly facility with a variety of robotics technologies. In another example, industrial automation environment 110 could be a series of data storage facilities employing various automated processes for facility and equipment management. In yet another example, industrial automation environment 110 could be a natural environment such as a mining or earth-moving environment where automation technology is used. Beneficially, system 100 supports any degree of proximity or separation between device 102, intermediary 104, and industrial automation environment 110, making the technology described herein flexible in a wide variety of applications.

Policy enforcement point 112 is configured to receive an indication of operational technology 114 and a command, to connect first communication channel 120 to the operational technology 114, and to transmit the command along first communication channel 120 to the operational technology 114. Policy enforcement point 112 could be any computer, application, or edge device capable of managing network logic or device logic for operational technology in an industrial automation environment. Policy enforcement point 112 connects and disconnects communication channels between multiple operational technology 114 and between operational technology 114 and policy enforcement point 112 such that external devices like device 102 can communicate with operational technology 114 via policy enforcement point 112 once commands are classified as approved by policy engine 106. In an example where industrial automation environment 110 is an automotive assembly facility populated by a variety of robotics technologies, policy enforcement point 112 is configured to receive the paths for communication channels to be used for executing an approved command on operational technology 114 and to connect the indicated communication channels. In such an example, operational technology 114 could be automotive robotic technology that executes a robotic function upon receiving the approved command via a communication channel connected by policy enforcement point 112.

Operational technology 114 could be any device used in an industrial automation environment including physical devices and software, such as robotics, numerical control systems, programmable logic controllers, various sensor technologies, and more. In one example, operational technology 114 could be an automated conveyor configured to move items around an industrial automation environment. In such an example, a command received from device 102 could be an instruction to advance the conveyor a specific distance.

Operational technology 114 is communicatively coupled to policy enforcement point 112 by first communication channel 120. First communication channel 120 may be part of a local area network (LAN), a cloud-based network, or any other sufficient means of network communication that can be connected and disconnected. Industrial automation environment 110 may represent a factory, a mine, a laboratory, or any environment in which automated forms of industrial equipment are in use.

Transmission of communications via link 116, first communication channel 120 and second communication channel 118 could be performed under a variety of standard communication protocols, such as Universal Asynchronous Receiver and Transmitter protocol, Universal Serial Bus protocol, Serial Peripheral Interface protocol, or any suitable intersystem communication protocol capable of facilitating message transmission between device 102 and intermediary 104, between intermediary 104 and policy enforcement point 112, and between policy enforcement point 112 and operational technology 114. Communication could also be governed by secure protocols, examples of which include Transport Layer Security (TLS), Internet Protocol Security (IPsec), Secure Shell (SSH), and Secure Socket Layer (SSL). In some examples, multiple communication protocols of varying degree of security are used.

In use of an embodiment of the present technology, a command executable relevant to operational technology 114 of industrial automation environment 110 is issued by device 102. For example, a user may generate and enter the command into a user interface, such as user interface 700 of FIG. 7, of device 102. User interface 700 of FIG. 7 is broadly representative of any user interface of a device 102 sufficient for the entry of commands associated with a access account. The command the user submits could be a command for execution by operational technology 114, a permanent security policy configuration such as the addition of a new piece of operational technology in addition to operational technology 114, a temporary security policy configuration such as a time-limited change in access authority for operational technology 114, or any other directive relevant to industrial automation environments and their operational technologies. The user's interaction with the user interface and entry of a command is associated with a access account of the user. The command could take the form of an executable instruction that could be enacted by a processor upon reception, a natural language instruction requiring interpretation to be carried out, or any other suitable means of conveying a directive relevant to industrial automation.

Intermediary 104 intercepts the command before it is transmitted to the industrial automation environment and processes it via policy engine 106. Policy engine 106 classifies the command as either approved or denied. To classify the command, policy engine 106 first evaluates at least the credentials for the access account associated with the command and operational technology 114 upon which the command is to be executed to identify a security policy of policy engine 106. Other criteria could also be evaluated along with the access account credentials and operational technology 114 associated with a command to identify the security policy to be applied, such as safety policies or internal standards. Policy engine 106 uses the identified security policy to determine a set of parameter values for the command. The parameters of the set of parameters may include qualitative and quantitative values. Example of parameters include "number of attempted command submissions by user," "number of operational technology devices queried by user," "job title of a user," or "geographic location of a user," among other possibilities.

Policy engine 106 uses the set of parameter values to evaluate an intent of the command. The intent of a user may be legitimate or illegitimate. For example, where a bad actor seeks to disrupt the operation of an industrial automation environment without authority to do so, their intent is illegitimate. In another example, a competitor wishing to gain insight on a trade secret process in use in an industrial environment by remotely requesting data from operational technology 114 has an illegitimate intent. Generally, commands with an illegitimate intent are classified as not approved. Commands where the user genuinely seeks to carry out the business of the industrial enterprise are commands with legitimate intent. These commands may still be classified as not approved depending on the outcome of evaluating the intent against the identified security policy.

To determine the intent, policy engine 106 evaluates the set of parameter values that is used. For example, an unexpected location of the user weighs strongly against the classification of a given command as approved. In such an example, where a command is generated on device 102 is a foreign locality in which no users are authorized, policy engine 106 determines that the intent is illegitimate which results in a command classification of unapproved. In another example, a command is mistakenly generated that, if executed, would result in the complete shutdown of industrial automation environment 110. In such an example, the intent may be in good faith, but the intent remains illegitimate. Thus, because the command does not represent a valid expression of authority compared to the identified security policy, the intent of the command is classified is not legitimate and the command will be classified as not approved. Because the command here implicates a significant result that, if deployed may cause substantial financial or mechanical trouble, the security policy applied requires the highest degree of validation prior to classification of the command as approved. In some examples, no extent of authority may exist that is sufficient to support policy engine 106 classifying a command as approved. For example, where a command is generated on device 102 that would cause operational technology to irreparably harm itself, it may be the case that no set of parameters values exist such that the command will be classified as approved. In other examples, a command determined to be predicated on illegitimate intent may not result in an immediate and categorical denial to execute the command, but rather may result in queries to the user for additional parameters, such as multifactor authentication credentials. In such examples, where additional parameters are provided by the user, policy engine 106 includes the additional parameters in the evaluation of the command. In some cases, where the additional parameters are congruent with the relevant security policies, an initial determination of illegitimate intent may be overcome. For example, a access account may have credentials associated with a high authority employee of an enterprise tasked with maintaining critical safety procedures in a NSS. In a situation where the industrial environment is experiencing unanticipated problems, such as a flood, the user may attempt to shut down all operational technology. The initial analysis may determine that under normal circumstances, the intent of the command is illegitimate. The user may then be prompted for additional parameters, such as an override key. Entry of the override key can be used in an additional analysis of the command, which in this example, results in a determination that the intent of the user is in fact legitimate.

Policy engine 106 weighs the intent of the command and the command against the identified security policy to apply a classification to the command. Additional means for evaluating the command via the output of an artificial intelligence system are disclosed herein. Further additional means for evaluating the intent of a command via natural language processing model are disclosed herein. Where the intent of the user is congruent with anticipated behavior outlined in the selected security policy, the command is classified as approved, second communication channel 118 is connected, and the command is transmitted to a policy enforcement point 112. Where the intent of the user is not congruent with anticipated behavior outlined in the selected security policy, the command is classified as denied and is not transmitted to policy enforcement point 112.

In response to a command classified as denied, the intermediary 104 blocks the command from being transmitted to the industrial automation environment by not connecting a communication channel to policy enforcement point 112. In an embodiment of the disclosed technology, a previous command of the user classified as denied may act as a subsequent parameter value in a later intent determination for a future command from the same user. In some cases, where a command classified as approved nevertheless results in a negative outcome, such as unplanned system downtime, a security policy can be updated to reflect that negative outcome and to use entry of such a command as a parameter for subsequent intent evaluations.

In response to a command classified as approved, policy engine 106 identifies a first communication channel 120 to connect between policy enforcement point 112 and operational technology 114 and a second communication channel between the intermediary 104 and policy enforcement point 112. Second communication channel 118 is connected and the command and an indication of the first communication channel 120 to be connected are transmitted along second communication channel 118 to policy enforcement point 112. Upon transmission of the command and indication of the first communication channel to policy enforcement point 112, second communication channel 118 is disconnected. Closing second communication channel 118 could be in response to other events, such as receiving an acknowledgement from policy enforcement point 112, receiving an acknowledgement from operational technology 114, or after a predetermined time delay. As an example, where policy engine 106 classifies a command to advance a conveyor a given distance as approved, the conveyor advancing instruction and the communication channel necessary to communicate with the appropriate conveyor are sent intermediary 104 to policy enforcement point 112 of industrial automation environment 110. Policy enforcement point 112 then connects the communication channel to operational technology 114, here being a conveyor. The command, including the advancing instruction, are sent to operational technology 114 to be carried out. In some zero-trust or relatively low-trust embodiments of the technology disclosed herein, first communication channel 120 and second communication channel 118 may be disconnected immediately after completing their respective contributions to delivering the command to operational technology 114. Beneficially in the conveyor example, evaluation and approval of the conveyor specific command mitigates risk of physical harm to persons and devices from equipment moving based on remotely executed commands. In other embodiments, the disconnection of first communication channel 120 and second communication channel 118 may occur in response to additional steps in the communication process between policy engine 106, policy enforcement point 112, and operational technology 114. Examples of events that may trigger the disconnection of first communication channel 120 and second communication channel 118 include the receiving of an acknowledgement by policy engine 106 from policy enforcement point 112 indicating successful transmission of the command and indication of first communication channel 120, the receiving of an acknowledgement by policy enforcement point 112 from operational technology 114 indicating successful transmission of the command, and the receiving of an acknowledgement by policy enforcement point 112 from operational technology 114 indicating successful execution of the command. Other embodiments may trigger the disconnecting of first communication channel 120 and second communication channel 118 after a predetermined time delay.

Advantageously, the methods and system for network security disclosed herein greatly reduce the extent of unnecessary communication channels connected during the execution of a given command. By evaluating at least the command and associated access account, policy engine 106 of intermediary 104 determines exactly which instances of operational technology 114 are relevant for the execution of an approved command. This functions to minimize unneeded communication channels connected in response to an approved command by providing substantial specificity about the nature of the command such that the policy engine can isolate operational technology for communication as necessary as opposed to interacting with entire classes of operational technology 114.

Figure 2:
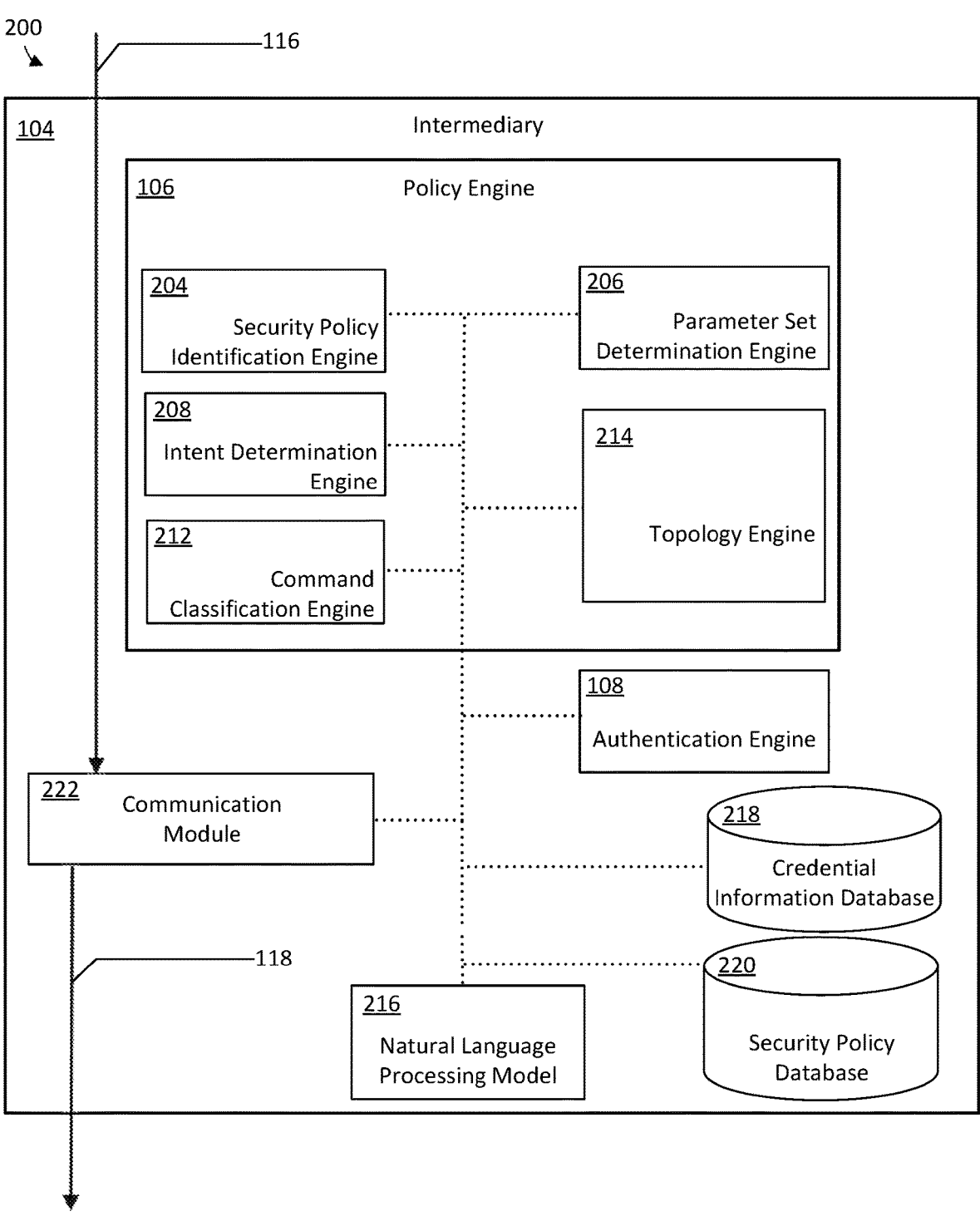
FIG. 2 illustrates additional detail of the network security system of FIG. 1.

FIG. 2 illustrates intermediary 104 in greater detail 200. Elements of intermediary 104 in greater detail 200 include intermediary 104, link 116, and second communication channel 118. Intermediary 104, link 116, and second communication channel 118 are described in detail in the associated text of FIG. 1.

Intermediary 104 includes policy engine 106, authentication engine 108, natural language processing model 216, communication module 222, credential information database 218, and security policy database 220. Additional elements may be present on intermediary 104 but have been excluded for clarity. Policy engine 106, authentication engine 108, natural language processing model 216, communication module 222, credential information database 218, and security policy database 220 are communicatively coupled such that messages can be transmitted between each component. Policy engine 106 is discussed in greater detail in the associated text to FIG. 1.

Communication module 222 is communicatively coupled with a device, such as device 102, via link 116. Communication module 222 could be any hardware or software capable of intercepting, receiving, and transmitting messages in a network environment. Communication module 222 is representative of software capable of transmitting, receiving, and managing outgoing communication signals, incoming communication signals, and associated communication protocols, respectively. Communication module 222 is configured to intercept messages from device 102 and to route those messages within intermediary 104. First, communication module 222 routes the message to authentication engine 108, which authenticates the access account used to issue the command. If authentication engine 108 authenticates the access account, communication module 222 routes the command to policy engine 106. In some examples, authentication engine 108 may route the command directly to policy engine 106 upon authenticating the access account. If authentication engine 108 does not authenticate the account (i.e., the authentication fails), authentication engine 108 may produce a failure message, which is transmitted via communication module 222 to device 102.

In cases where the access account is authenticated, communication module 222 may facilitate further processes of policy engine 106. For example, where a command is generated by a user seeking to advance a conveyor, the user may input that command into a user interface, such as user interface 700 of FIG. 7. The command, directed to and intended for operational technology 114, in this case a conveyor, does not arrive at operational technology 114 but rather is blocked and collected at intermediary 104 where it arrives at communication module 222. Having collected the intercepted message, communication module 222, after confirming authentication by authentication engine 108, may facilitate the command classification process by communicatively connecting policy engine 106, natural language processing model 216, credential information database 218, and security policy database 220. For example, communication module 222 may parse data in the intercepted messages and determine which component to transmit the message to. In other cases, communication module 222 may transmit every message to natural language processing model 216 for natural language processing.

Natural language processing model 216 is communicatively coupled with the elements of policy engine 106 and other subcomponents of intermediary 104. Natural language processing model 216 is representative of any computational device or software model capable of computational linguistic evaluation of a command. In response to an input of a command in a natural language format, natural language processing model 216 is configured to interpret the command such that the language of the command is recognized and is translated into actionable instructions that can be acted on by policy engine 106. For example, a command may be generated intending to advance a conveyor a specific distance but be received in the form of the natural language phrase "move the conveyor forward one unit." In such an example, communication module 222 collects the command and transmits it to natural language processing model 216. Natural language processing model 216 interprets the natural language phrase to identify the executable components of the command and the operational technology against which it may be executed. In the foregoing example, natural language processing 216 identifies the operational technology, here a conveyor, and the command to be executed, here the advancement of the conveyor one unit. Having translated the command from natural language phrase to operable components, natural language processing model 216 is configured to transmit the translated command and operational technology to policy engine 106 for classification. In some embodiments, natural language processing model is an artificial intelligence model or system trained to interpret natural language inputs and output specific instructions executable by a processor (e.g., actionable instructions).

Credential information database 218 is an entity providing memory storage structure containing information associated with a access account. In some examples, the entity providing memory storage structure represented by credential information database 218 is a database, while in other examples, it may take the form of a datastore or a data lake. Such information may include credentials of the access account, a degree of authority associated with the access account, an expected locality of the user associated with the access account, and a job role of a user associated with the access account, among other parameters. Credential information database 218 could be any hardware or software capable of storing text and numerical data. Credential information database 218 could be localized or could be hosted on cloud-storage. Where communication module 222 collects a command generated on device 102, an indication of the access account associated with the command is sent to credential information database 218, where contextual data relevant to the access account is gathered. Contextual data relevant to the access account may include who the user (or non-human actor) is and what the user (or non-human actor) is permitted to do. Credential information database 218 then provides the contextual data to policy engine 106 for use in classification.

Security policy database 220 is memory storage containing a number of security policies. The security policies stored in security policy database 220 dictate varying degrees of restrictions and the criteria for access to and control over operational technology of an industrial automation environment, such as operational technology 114 of industrial automation environment 110. Security policies generally use rules and contextual information for rule application configured to safeguard the interests of an enterprise. Certain policies may dictate the degree of authority the user or non-human actor must have before being granted the authority to access certain operational technologies or to alter security policies. Other policies may account for logistic or social realities, such as geographic locations or times during which certain users may be granted authority to access certain operational technologies or to alter security policies. For example, a security policy regarding a mission critical process may require that only one technician has the authority to halt the process and may only do so during a particular time frame and from a particular location. Other security policies relate to industrial safety standards. For example, safety standards for some operational technology require a "line of sight," meaning a user intending to execute a command on operational technology must be able to see the operational technology with an unobstructed view. This industrial safety standard could be carried out by a security policy having a geographic location requirement for a device associated with a digital geographic fence around the operational technology. A digital geographic fence, or geo-fence, is a known process for customizing location based conditional logic and will not be discussed in more detail here.

Policy engine 106 includes security policy identification engine 204, parameter set determination engine 206, intent determination engine 208, command classification engine 212, and communication channel identification engine 214. Each of security policy identification engine 204, parameter set determination engine 206, intent determination engine 208, command classification engine 212, and communication channel identification engine 214 are communicatively coupled. Where communication module 222 collects an intercepted command and transmits the command to policy engine 106, each of security policy identification engine 204, parameter set determination engine 206, intent determination engine 208, command classification engine 212, and communication channel identification engine 214 may be called upon to perform a portion of the greater security analysis.

Security policy identification engine 204 is software, that when executed, identifies a relevant security policy of security policy database 220 based on a access account of a command and operational technology 114. Security policy identification engine 204 may be any software or application capable of identifying a security policy in response to and based on an input of a access account and an operational technology. Upon receiving a command collected at communication module 222, security policy identification engine 204 queries security policy database 220 for security policies relevant to the access account associated with the command, the operational technology the command is to be executed on, or a combination thereof. For example, a command may be intercepted at intermediary 104 that instructs a conveyor to advance a given distance. In such an example, relevant security policies may include rules relating to safety standards and in-house protocols for efficiency. Example security policies may further include rules relating to economic efficiency, logistic efficiency, safety, protection of operational technology over time, cyber security, commercial security, national security, and others. Security policy identification engine 204 is configured to identify a relevant security policy based on the command and the operational technology. Additional restrictions for how security policies are selected and implemented may be included in security policy identification engine 204. For example, where biohazardous material is involved in the process of an industrial automation environment, security may generally be very strict. The strictness of security in such an environment can be realized by providing security policy identification engine 204 with strict standards for which security policies are implemented under which circumstances. Likewise, security policy identification engine 204 can be configured to operate in relatively low security environments through the standards for which security policies are selected under which circumstances. Beneficially, in this way, security policy identification engine 204 can be tuned to correspond to the security needs of the industrial automation environment with which intermediary 104 is connected.

Parameter set determination engine 206 is software, that when executed, identifies a relevant parameter set and determines values for each of the parameters based on a security policy of security policy database 220 as selected by security policy identification engine 204. Parameter set determination engine 206 may be any software or application capable of identifying a parameter set in response to and based on an input of a security policy. A set of parameters may include parameters such as credentials of a user associated with the access account, a role of the user, a location of the user, a current activity of the user, a preceding activity of the user, a historical record of activity of the user, a time of a command to be executed, a date of a command to be executed, a nature of the command to be executed, or a combination thereof. Where security policy identification engine 204 identifies a given security policy, an indication of the identified security policy is transmitted to parameter set determination engine 206. Where security policy identification engine 204 is tuned for a high degree of security and thus selects stringent security policies, parameter set determination engine 206 selects and determines values for a correspondingly broad range of varying significance parameters. Where security needs are relatively high, a broad range of parameters supports a broad evaluation and therefore a finer resolution of data to evaluate in classifying a command. Likewise, where security needs are relatively low, applicable standards may be achieved with the evaluation of fewer points of data.

Intent determination engine 208 is software, that when executed, identifies an intent for a command. Intent for a command is evaluated based on a set of parameter values as identified by parameter set determination engine 206. Intent determination engine 208 may be any software or application capable of determining an intent of a command in response to and based on an input of a set of parameter values. For example, intent determination engine 208 may be an artificial intelligence (AI) engine or system that determines an intent. In some embodiments, intent determination engine 208 may be an AI classification engine that is trained to classify an intent as legitimate or illegitimate. In other embodiments, intent determination engine 208 may be an AI engine that determines an intent more specifically (e.g., user intends to legitimately move a conveyor; user intends to illegitimately start machine X; or the like). Generally, a command with illegitimate intent will be denied. In scenarios where the intent is legitimate, analysis of additional contextual detail is used to classify a command as approved or denied. That additional detail may include the status of an operational technology, the capability of an operational technology, typical instructions given to an operational technology, or a combination thereof, among additional criteria. For example, an unexpected location of the user weighs strongly against the classification of a given command as approved. In such an example, where a command is generated on device 102 is a foreign locality in which no users are authorized, policy engine 106 determines that the intent is illegitimate which results in a command classification of unapproved. In a similar example, the unexpected location of the user is not the geographic location of the device, but rather that the command was generated on a different terminal or device than expected. Here, where the geographic location is appropriate but the device 102 was unexpected, the unexpected login device weighs against the legitimacy of the command. In another example, a command is mistakenly generated that, if executed, would result in the complete shutdown of industrial automation environment 110. In such an example, the intent may be in good faith, but the intent remains illegitimate. Thus, because the command does not represent a valid expression of authority compared to the identified security policy, the intent of the command is classified is not legitimate and the command will be classified as not approved. Because the command here implicates a significant result that, if deployed may cause substantial financial or mechanical trouble, the security policy applied requires the highest degree of validation prior to classification of the command as approved. In some examples, no extent of authority may exist that is sufficient to support policy engine 106 classifying a command as approved. For example, where a command is generated on device 102 that would cause operational technology to irreparably harm itself, it may be the case that no set of parameters values exist such that the command will be classified as approved.

Command classification engine 212 is software, that when executed, classifies a command as approved or denied. Command classification engine 212 may be any software or application capable of classifying a command as approved or denied in response to and based on an input of an intent of the command. In some embodiments, command classification engine 212 may be an artificial intelligence classification engine. Command classification engine 212 may be integrated into intent determination engine 208 or may function as an independent component of policy engine 106. In response to intent determination engine 208 identifying legitimate intent for a command, command classification engine 212 analyzes the message and classifies the command as either denied or approved. Command classification engine 212 receives the identified security policies from security policy identification engine 204 and the parameter set from parameter set determination engine 206 and applies the security policies and analyzes the parameter set to determine whether the command is approved or denied. Denied commands are blocked, and approved commands are transmitted to communication channel identification engine 214. In some embodiments, denied commands are logged to aid in further analysis of additional requests. In response to intent determination engine 208 identifying illegitimate intent for a command, command classification engine 212 classifies the command as not approved (i.e., denied), and the command is blocked so that no communication channels are connected. For example, where a bad actor generates a command intended for execution on operational technology 114 and the command is determined to have illegitimate intent by intent determination engine 208, command classification engine 212 classifies the command as not approved. As such, no channel to policy enforcement point 112 or operational technology 114 is connected. Where, for example, a command is determined to have legitimate intent and the command is approved, the command and an indication of operational technology 114 is passed to communication channel identification engine 214 for further processing.

Communication channel identification engine 214 is software, that when executed, identifies a communication channel for a command executable against an operational technology, such as operational technology 114 of FIG. 1, based on an input of a command with a classification of approved. Communication channel identification engine 214 may be any software or application capable of identifying a communication channel for connecting to and communicating with operational technology in response to and based on an input of a command executable against an operational technology of an industrial automation environment. In response to receiving an approved command and an indication of operational technology 114, communication channel identification engine 214 identifies the necessary communication channel between policy enforcement point 112 and operational technology 114. First communication channel 120 is generally representative of the connection between policy enforcement point 112 and operational technology 114. First communication channel 120 may be a static communication channel or may be dynamic. Where first communication channel 120 is static, the same channel is to be used each time operational technology 114 is communicated with by device 102. Where first communication channel 120 is dynamic, the channel required to connect policy enforcement point 112 and operational technology 114 is subject to change. In such embodiments, communication channel identification engine 214 tracks the dynamic channels between policy enforcement point 112 and operational technology 114 such that when an approved command is received, communication channel identification engine 214 can pass an accurate and up to date indication of the required communication channel to communication module 222. In some embodiments, dynamic channel routing is motivated by a critical task occurring on a given connection. Here, where a connection is occupied by a message relating to a critical task, the NSS routes communication along other connections as a means to preserve the connection and minimize risk for the critical task. Further detail on embodiments having a dynamic style of first communication channel 120 is included in the associated text of FIG. 8.

In use, a command generated by a user on a device 102 is intercepted by intermediary 104 and collected at communication module 222 via link 116. In response to receiving a command, communication module 222 may transmit the command to natural language processing model 216. Natural language processing model 216 transmits the command and any actionable commands to policy engine 106 to begin the classification process. Additional modules and assets are within intermediary 104 but external to policy engine 106, such as natural language processing model 216, credential information database 218, and security policy database 220. These additional modules perform various parts of the command classification process of various embodiments of the disclosed technology.

In an embodiment, where a command is received by communication module 222 and transmitted to policy engine 106, the command is first used to identify a access account associated with the command and the operational technology, such as operational technology 114, the command is to be executed against.

At policy engine 106, security policy identification engine 204 evaluates the relevant operational technology and associated access account by referencing credential information database 218. Security policy identification engine 204 queries credential information database 218 to gather contextual information for the access account to inform the application of the security policy. For example, where a access account with a high degree of authority is identified, that access account will typically be granted a wider range of authority than a access account associated with a low degree of authority. A access account with a high degree of authority could be the access account of a system architect engineer or plant maintenance engineer, while a access account with a low degree of authority might be the account of an intern. Security policy strictness is further based on the type, nature, criticality, safety concerns, and associated tasks of the operational technology relevant to the command. Where use of an operational technology represents a physical, mechanical, or financial risk, a stricter degree of security policy may be applied. Alternatively, where an operational technology represents a relatively low physical, mechanical, or financial risk, a more lenient degree of security policy may be applied. In either case or in an intermediary example, security policy identification engine 204 determines which security policy to apply based on an analysis similar to that above.

Based on the access account and operational technology, security policy identification engine 204 selects a security policy to apply in evaluating the command by referencing security policy database 220. Using the identified security policy, parameter set determination engine 206 establishes a set of parameter values for the command. The set of parameter values are fed to intent determination engine 208, which determines an intent of command for the user. The intent of the command along with the security policies identified by security policy identification engine 204 are used by command classification engine 212 to classify the command as approved or denied. Where a command is approved, communication channel identification engine 214 determines which communication channels are necessary to connect such that the command can be executed on the intended operational technology. For example, where a command is classified as approved and requires communication channels connected to a group of operational technologies, communication channel identification engine 214 identifies the channels necessary to communicatively connect the relevant operational technology and a policy enforcement point of the industrial automation environment so the approved command can be transmitted for execution.

Where a command is classified as denied, no communication channels are connected between intermediary 104 and industrial automation environment 110. Further, commands classified as denied can be logged, informing a greater risk assessment evaluation for subsequent attempts to enter similar commands or for attempts to enter commands by the same user. Beneficially, this isolates operational technology from commands classified as denied and supports zone specific control of operational technology.

In response to command approval and identification of the necessary communication channels, policy engine 106 connects second communication channel 118 between intermediary 104 and a policy enforcement point, such as policy enforcement point 112, and directs communication module 222 to transmit the approved command and an indication of the necessary communication channels via second communication channel 118.

Figure 3A:
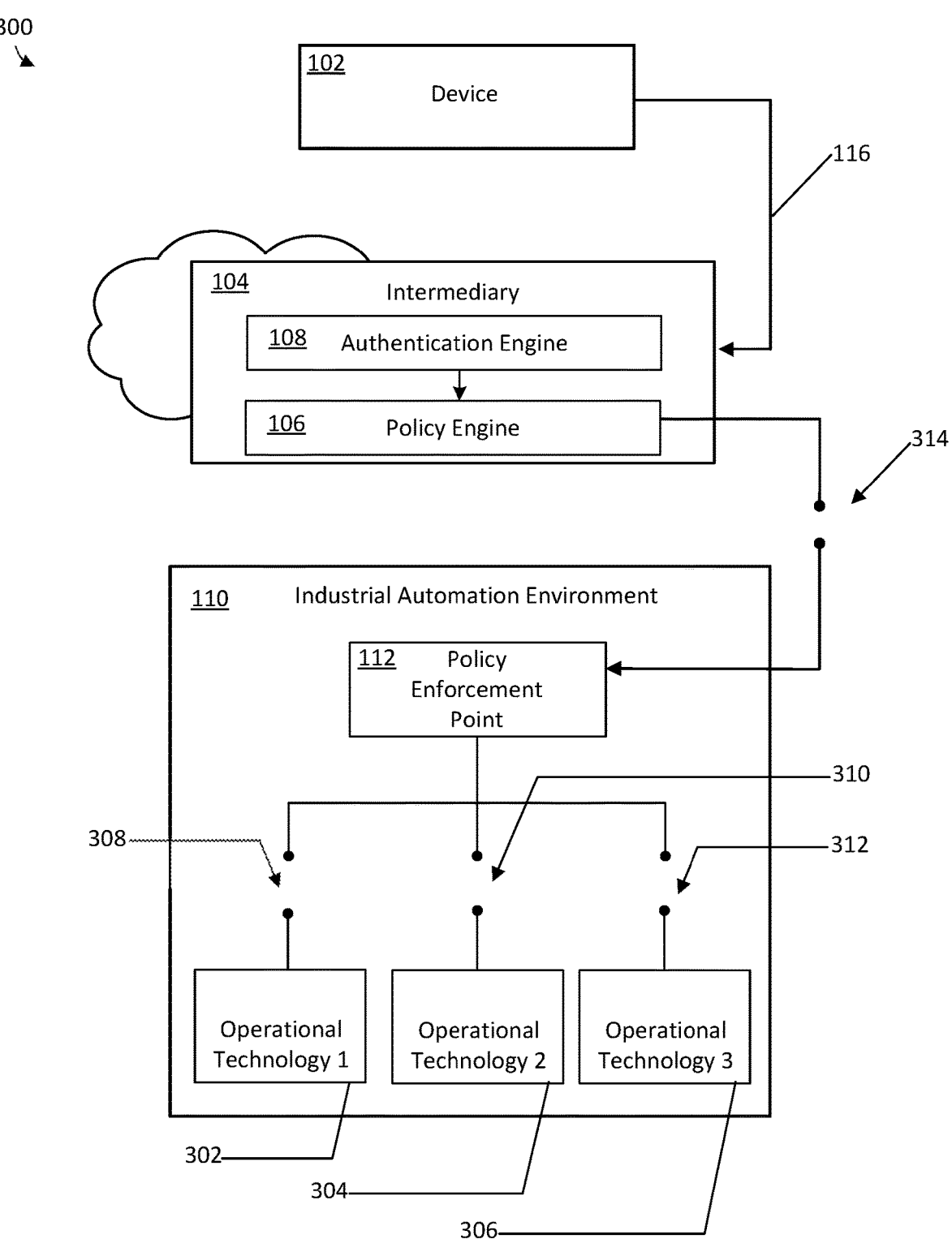
FIGS. 3A and 3B illustrate system diagrams of network security systems in a zero-trust configuration, in accordance with embodiments of the present technology.

FIG. 3A illustrates system 100 in zero-trust configuration 300. System 100 in zero-trust configuration 300 includes device 102, intermediary 104, and industrial automation environment 110. System 100 in zero-trust configuration 300 is similar to system 100 but has additional detail regarding communication channels in a zero-trust style network. Intermediary 104 includes policy engine 106 and authentication engine 108. Intermediary 104 and device 102 are connected by link 116, while policy engine 106 and policy enforcement point 112 are coupled by disconnected second communication channel 314. Industrial automation environment 110 includes policy enforcement point 112 and operational technology 302, 304, and 306. System 100, device 102, intermediary 104, policy engine 106, industrial automation environment 110, policy enforcement point 112, and link 116 are described in detail above.

System 100 in zero-trust configuration 300 further includes operational technology 302, operational technology 304, and operational technology 306, which are coupled to policy enforcement point 112 via disconnected first communication channel 308, disconnected first communication channel 310, and disconnected first communication channel 312, respectively.

Operational technology 302, operational technology 304, and operational technology 306 are each equivalent to operational technology 114 as described above. Operational technology 302, operational technology 304, and operational technology 306 could each be any automated device used in an industrial automation environment including physical devices and software, such as robotics, numerical control systems, programmable logic controllers, various sensor technologies, and more. In some embodiments, operational technology 302, operational technology 304, and operational technology 306 are each a similar class of technology and may frequently have commands executed upon the entire group. In other embodiments, operational technology 302, operational technology 304, and operational technology 306 may be entirely independent and unrelated devices. For example, operational technology 302, operational technology 304, and operational technology 306 may be a first, second, and third conveyor that together create a pathway for industrial manufacturing. In such an example, commands intended to be executed on each of operational technology 302, operational technology 304, and operational technology 306 can reasonably expected. In another example, operational technology 302 may be a conveyor, operational technology 304 may be an automated thermostat, and operational technology 306 may be an automated lathe. In this example, while possible, it is much less likely each of operational technology 302, operational technology 304, and operational technology 306 are implicated by a single given command. Beneficially, policy engine 106 flexibly identifies the relevant operational technology for each command when each command is entered on device 102. Another benefit embodied in the disclosed technology is the ability to enforce zone to zone isolation between operational technology equipment. Further, where a single command, when executed, is to be carried out on a group of operational technology devices, the degree of authority required for execution of the command can be normalized over the group. In other words, where a single command would be executed on a high security operational technology and a low security operational technology, the single command can be evaluated with regard to the stringent security policies associated with the high security operational technology.

Disconnected second communication channel 314 is similar to second communication channel 118. Here, however, disconnected second communication channel 314 is in a zero-trust configuration. Because it has not yet been implicated by an approved command, disconnected second communication channel 314 is disconnected and cannot be communicated along. Disconnected second communication channel 314 could be part of a local area network (LAN), a cloud-based network, or any other sufficient means of network communication that can be connected and disconnected.

Disconnected first communication channel 308, disconnected first communication channel 310, and disconnected first communication channel 312 are each similar to first communication channel 120, as described above. Here, however, disconnected first communication channel 308, disconnected first communication channel 310, and disconnected first communication channel 312 are in a zero-trust configuration. Because they have not yet been implicated by an approved command, disconnected first communication channel 308, disconnected first communication channel 310, and disconnected first communication channel 312 are disconnected and cannot be communicated along. First communication channel 308, first communication channel 310, and first communication channel 312 could each be part of a local area network (LAN), a cloud-based network, or any other sufficient means of network communication that can be connected and disconnected.

In use, no communication channels are connected prior to a command being approved by policy engine 106. FIG. 3 illustrates a zero-trust network prior to any command classification, as represented by disconnected first communication channel 308, disconnected first communication channel 310, disconnected first communication channel 312, and disconnected second communication channel 314. Independent of system 100 in zero-trust configuration 300 connecting the necessary channels, communication with operational technology 302, operational technology 304, and operational technology 306 is not possible. By defaulting to a schema where no communication channels are connected between intermediary 104 and policy enforcement point 112 and between policy enforcement point 112 and operational technology 114, a NSS can optimally minimize the number of potential targets for unauthorized use or for misuse.

Figure 3B:
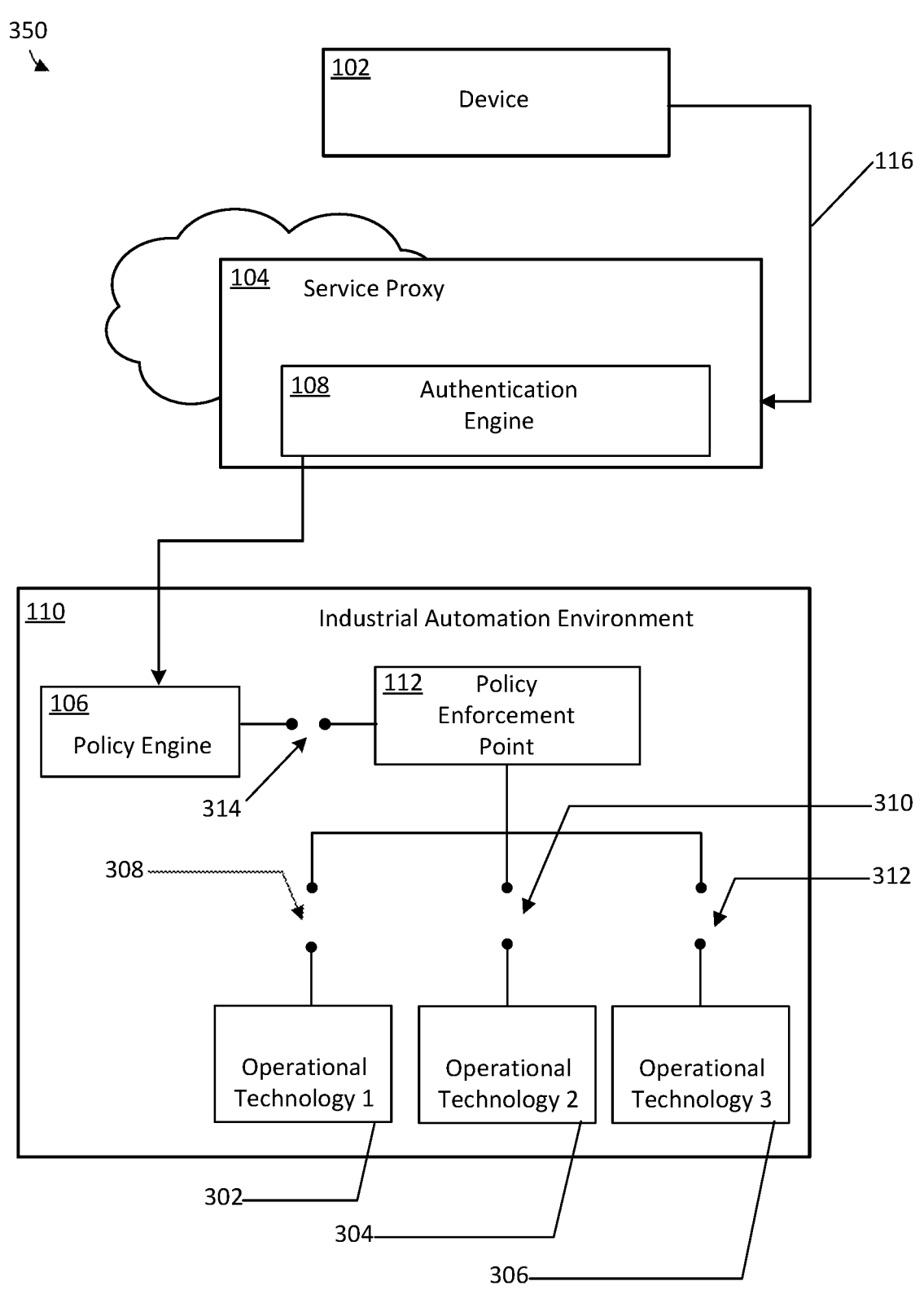

FIG. 3B illustrates system 350 in a zero-trust configuration. System 350 is similar to system 100, however, in system 350, policy engine 106 resides on a server in industrial automation environment 110. Accordingly, when authentication engine 108 authenticates an access account associated with a command, authentication engine 108 transmits the command to policy engine 106. Policy engine 106 performs as described throughout. Policy engine 106 in system 350 is coupled to policy enforcement point 112 via disconnected communication path 314 just as in system 100.

Figure 4:
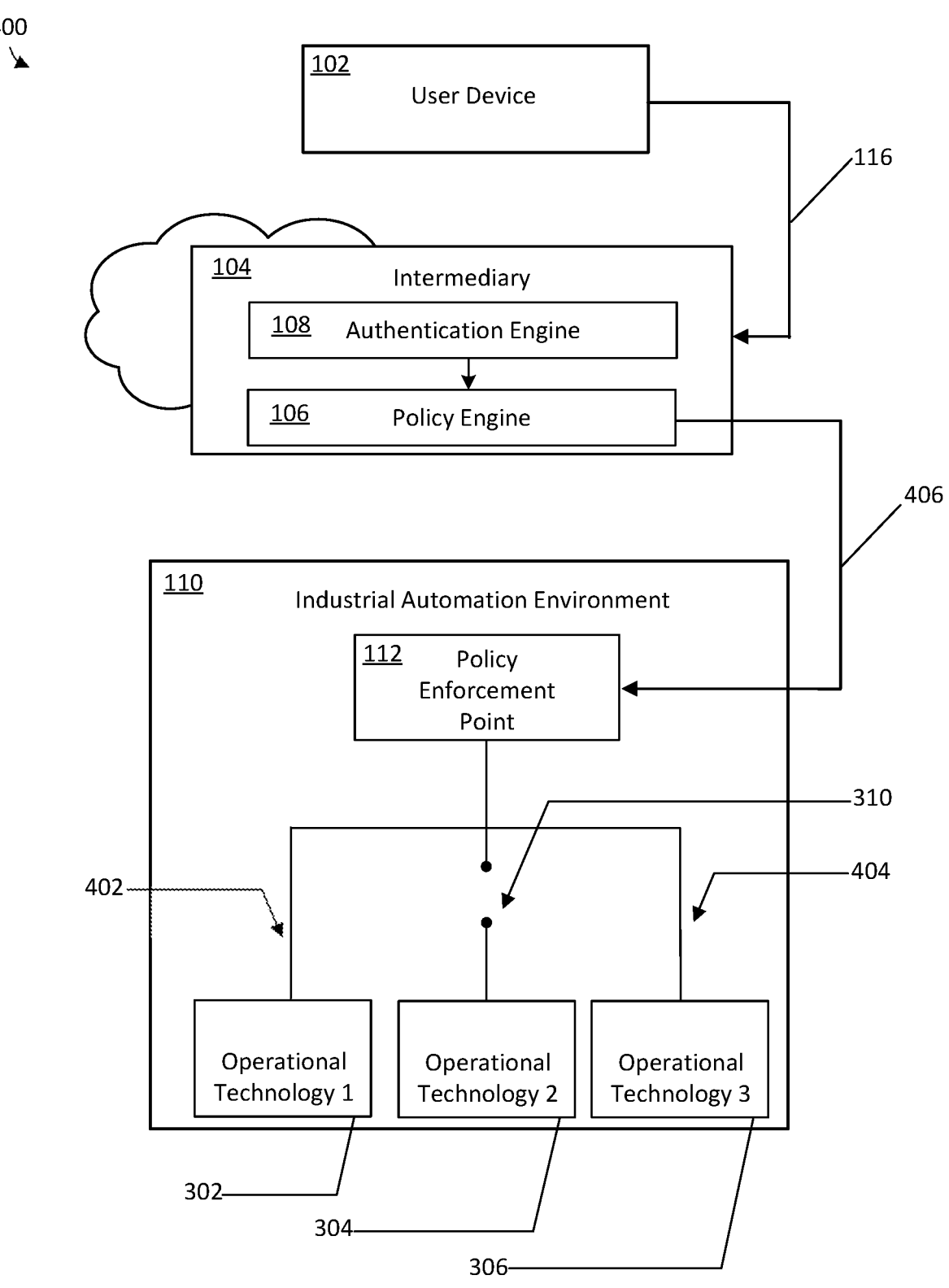
FIG. 4 illustrates a system diagram of a network security system in a zero-trust configuration after a command is classified as approved, in accordance with embodiments of the present technology.

FIG. 4 illustrates system 100 in zero-trust configuration after a command is classified as approved 400. System 100 in zero-trust configuration after a command is classified as approved 400 is similar to system 100 in zero-trust configuration 300. System 100 in zero-trust configuration after a command is classified as approved 400 includes device 102, intermediary 104, and industrial automation environment 110. Intermediary 104 includes policy engine 106. Intermediary 104 and device 102 are connected by link 116. Policy engine 106 and policy enforcement point 112 are coupled by connected second communication channel 406. Communication channel 406 is connected by policy engine 106 in response to the command being classified as approved. Industrial automation environment 110 includes policy enforcement point 112 and operational technology 302, operational technology 304, and operational technology 306. System 100, device 102, intermediary 104, policy engine 106, authentication engine 108, industrial automation environment 110, policy enforcement point 112, link 116, operational technology 302, operational technology 304, operational technology 306, and disconnected first communication channel 310 are described in detail above.

System 100 in zero-trust configuration after a command is classified as approved 400 further includes connected first communication channel 402 and connected first communication channel 404. Operational technology 302 is coupled to policy enforcement point 112 by connected first communication channel 402. Operational technology 304 is coupled to policy enforcement point 112 by disconnected first communication channel 310. Operational technology 304 is coupled to policy enforcement point 112 by connected first communication channel 404.

As illustrated in system 100 in zero-trust configuration after a command is classified as approved 400, a command has been classified as approved and transmitted to policy enforcement point 112 over connected communication channel 406. Policy engine 106, upon classifying the command as approved, identifies communication channels 402 and 404 to connect to facilitate communication between policy enforcement point 112, operational technology 302, and operational technology 306. Upon receiving a second command generated by policy engine 106 that includes the command issued by device 102 and the communication channels, policy enforcement point 112 connects communication channels 402 and 404.

Connected first communication channel 402 and connected first communication channel 404 represent connected and communicable channels specifically selected to support the execution of a command relevant to operational technology 302 and operational technology 306. For example, where operational technology 302 and operational technology 306 require maintenance but operational technology 304 does not, a command reflecting those maintenance needs may be generated at device 102, at which point it is intercepted by intermediary 104. Once approved by policy engine 106, the command is received by policy enforcement point 112 along with an indication from policy engine 106 that first communication channel 402 and first communication channel 404 are to be connected in order to fulfill the command. Policy enforcement point 112 then connects connected first communication channel 402 and connected first communication channel 404 and the command is, for example, transmitted to operational technology 302 and operational technology 306 for execution and the intended maintenance.

In use, operational technology 302 is communicatively coupled with policy enforcement point 112 over connected first communication channel 402 and operational technology 306 is communicatively coupled with policy enforcement point 112 over connected first communication channel 404. Operational technology 304 is coupled to policy enforcement point 112 by disconnected first communication channel 310. Disconnected first communication channel 310 is not connected for transmission and reception of messages. This could be because operational technology 304 was not relevant to the approved command, the user that generated the command lacked proper authority specifically to execute a command relevant to operational technology 304, operational technology 304 was busy with another task and was not interruptible, or other reasons relevant to the administration of industrial automation environment 110.

In this example, operational technology 302 and operational technology 306 are identified and available with respect to the approved command, while operational technology 304 remains isolated. Reasons disconnected first communication channel 310 has not been connected may include, for example, that operational technology 304 is not relevant to the command or that operational technology 304 is engaged in an uninterruptable task and is thus unavailable. As such, policy engine 106 directs policy enforcement point 112 to establish connected first communication channel 402 to operational technology 302 and connected first communication channel 404 to operational technology 306. However, because operational technology 304 is not deemed relevant to the command or is otherwise unavailable, policy enforcement point 112 leaves disconnected first communication channel 310 disconnected. Advantageously, system 100 in zero-trust configuration after a command is classified as approved 400 only connects communication channels to operational technology this is required for execution of a command and available. Otherwise connecting a communication channel to operational technology 304 in this example represents the creation of a target for misuse or unauthorized use for no benefit, computational or otherwise. Eliminating the connecting of first communication channel 310 reduces the likelihood of attacks to the industrial automation environment or other misuse simply by minimizing the volume of targets for such attacks or misuse.

Figure 5:
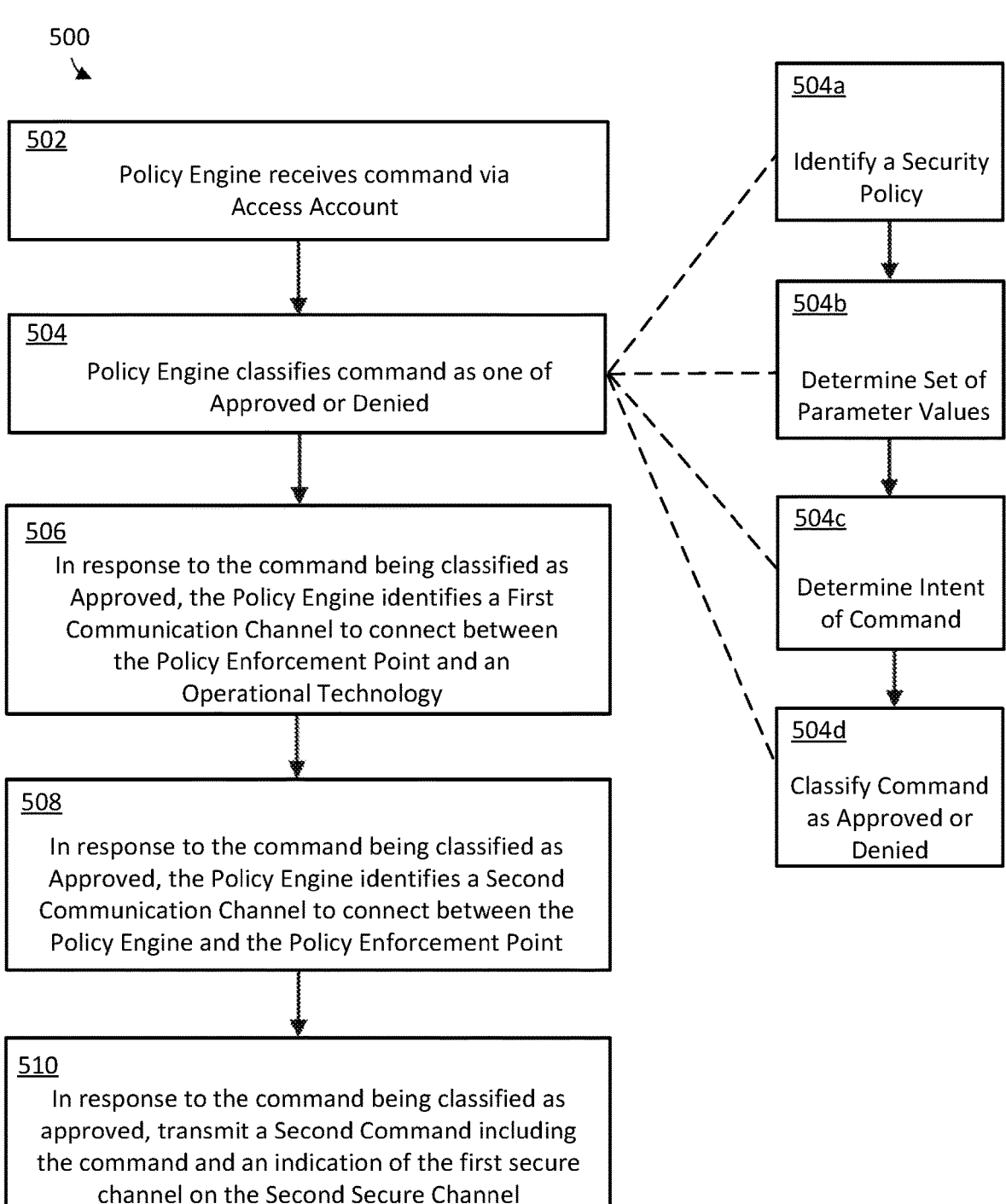
FIG. 5 illustrates a block diagram showing the steps of a computer-implemented method for dynamic attribute based edge-deployed security, in accordance with embodiments of the present technology.

FIG. 5 illustrates a method 500 for classifying a command and dynamically connecting communication channels in accordance with embodiments of the disclosed technology. The steps of method 500 may be performed by the components of system 100.

Method 500 begins at step 502 with a policy engine (e.g., policy engine 106) receiving a command via an access account. The command may include, for example, an instruction to halt performance of a task of an operational technology (e.g., operational technology 114), an instruction to begin performance of a task of an operational technology, an instruction to modify a security policy for a maintenance procedure, or other instructions relevant to the administration and function of an industrial automation environment. The instruction may be entered by a user using a user interface that allows, for example, a natural language text entry or a voice entered command. In some embodiments, the user entry may be via a structured user entry interface. In some embodiments, the command may issue via an access account associated with a non-human actor. As one example, the command received from be a command to jog a conveyor forward one unit.

At step 504, the policy engine (e.g., policy engine 106), classifies the command as approved or denied. The process of step 504 may be more specifically illustrated by steps 504a, 504b, 504c, and 504d. Classification of a command as approved or denied may include evaluation of a relevant security policy, a set of parameter values, and evaluation of an intent. Additional metrics and parameters may be included in the command classification process but are eliminated for clarity. Classification may be carried out by the policy engine (e.g., policy engine 106 of intermediary 104 or policy engine 106 in industrial automation environment 110). Evaluation of a command may be further performed in part by use of an artificial intelligence system configured to determine an intent of a user, a natural language processing model configured to interpret a user command in the form of a natural language instruction, or a combination thereof, such as intent determination engine 208.

At step 504a, a security policy is identified (e.g., by security policy identification engine 204) from a database of security policies (e.g., security policy database 220) by evaluating the access account associated with the submitted command and the operational technology the command is to be executed on. Evaluation of a access account is facilitated by reference to a credential information database (e.g., credential information database 218). A access account having credentials associated with a high degree of authority may result in a security policy being applied to a command of that user that allows for a greater degree of agency than a security policy applied to a command of a user where the user has a low degree of authority in the industrial automation environment.

As step 504*b*, the identified security policy is used to determine a set of parameter values for the command (e.g., by parameter set determination engine 206). A set of parameters may include parameters such as an credentials of a user associated with the access account, a role of the user, a location of the user, a current activity of the user, a preceding activity of the user, a historical record of activity of the user, a time of a command to be executed, a date of a command to be executed, a nature of the command to be executed, or a combination thereof. Where a security policy identification engine (e.g., security policy identification engine 204) identifies a given security policy, an indication of the identified security policy is transmitted to a parameter set determination engine (e.g., parameter set determination engine 206). Where security policy identification engine 204 is tuned for a high degree of security and thus selects stringent security policies, parameter set determination engine 206 selects and determines values for a correspondingly broad range of varying significance parameters. Where security needs are relatively high, a broad range of parameters supports a broad evaluation and therefore a finer resolution of data to evaluate in classifying a command. Likewise, where security needs are relatively low, applicable standards may be achieved with the evaluation of fewer points of data.

At step 504*c*, the set of parameter values is used to determine an intent of the command. Step 504*c* may be carried out by an artificial intelligence model configured to determine the intent of a user based on a command, such as intent determination engine 208. The intent of a user could be legitimate and to further the objectives of the enterprise operating the industrial automation environment. Even where the intent of a user is legitimate, mistakes or oversights may still occur. In this scenario, the technology disclosed herein advantageously gathers enough context from about the user, the command, and operational technology to protect an industrial automation environment against well-intentioned but problematic modifications to security policies. For example, where a user mistakenly keys a command that rotational speed for a motor that would destroy various coupled components, intent determination engine 208 will recognize the intent of the user and distinguish the mistakenly entered command as erroneous compared to expected, typical, or past commands, and therefore not a valid expression of authority. Intent determination engine 208 may identify the command as having illegitimate intent by comparing the command, the access account, the operational technology, or a combination with known procedures and expected outcomes. Where a command would result in a high likelihood of safety risk, procedural risks, any unfavorable outcome, or an outcome that cannot be sufficiently anticipated, intent determination engine 208 can identify the command as having illegitimate intent. As a result, the command will be classified as denied. In contrast, the intent could be legitimate, generally resulting in approval of the command.

At step 504*d*, the intent of the command is evaluated and used in classifying the command as approved or denied. Command classification may be performed by, for example, command classification engine 212. As mentioned above, a command generated by a user with illegitimate intent will generally be denied. In scenarios where the intent of a user is legitimate, analysis of additional contextual detail is used to classify a command as approved or denied. That additional detail may include the status of an operational technology, the capability of an operational technology, typical instructions given to an operational technology, or a combination thereof, among additional criteria.

At step 506, in response to a command being classified as approved, the policy engine (e.g., the communication channel identification engine 214 of policy engine 106) identifies a first communication channel between a policy enforcement point (e.g., policy enforcement point 112) and an operational technology (e.g., operational technology 114) as needed to execute the approved command (e.g., stop the motor of operational technology 114). The first communication channel may be part of a local area network (LAN), a cloud-based network, or any other sufficient means of network communication that can be connected and disconnected. In some embodiments, the command need not be executed by the operational technology, but information for executing the command may be needed from the operational technology or information from execution of the command may be sent to the operational technology, such that the communication channel connection facilitates completion of execution of the command. In other words, the command may be relevant to the operational technology without being executed by the operational technology and the desired communication channel may still be identified for connection.

At step 508, the policy engine (e.g., the communication channel identification engine 214 of policy engine 106) identifies and connects a second communication channel between the policy engine (e.g., policy engine 106) and the policy enforcement point (e.g., policy enforcement point 112). The second communication channel may be part of a local area network (LAN), a cloud-based network, the internet, or any other sufficient means of network communication that can be connected and disconnected.

At step 510, the policy engine transmits a second command to the policy enforcement point via the second communication channel. The second command may include the command and the indication of the paths for the communication channels to be connected. Sending the command and the indication of the paths for the communication channels to be connected allows the policy enforcement point to identify which communication channel to connect and what message to send on the newly connected communication channel in order to support the execution of the command. In some embodiments, the path indicated for the communication channel may not be the most direct path between the two endpoints. For example, dynamic path configuration for communication channels may be used that serves to avoid busy paths, create randomness within the network for thwarting misuse, and the like. The dynamic path selection is discussed in more detail with respect to FIG. 8.

Figure 6:
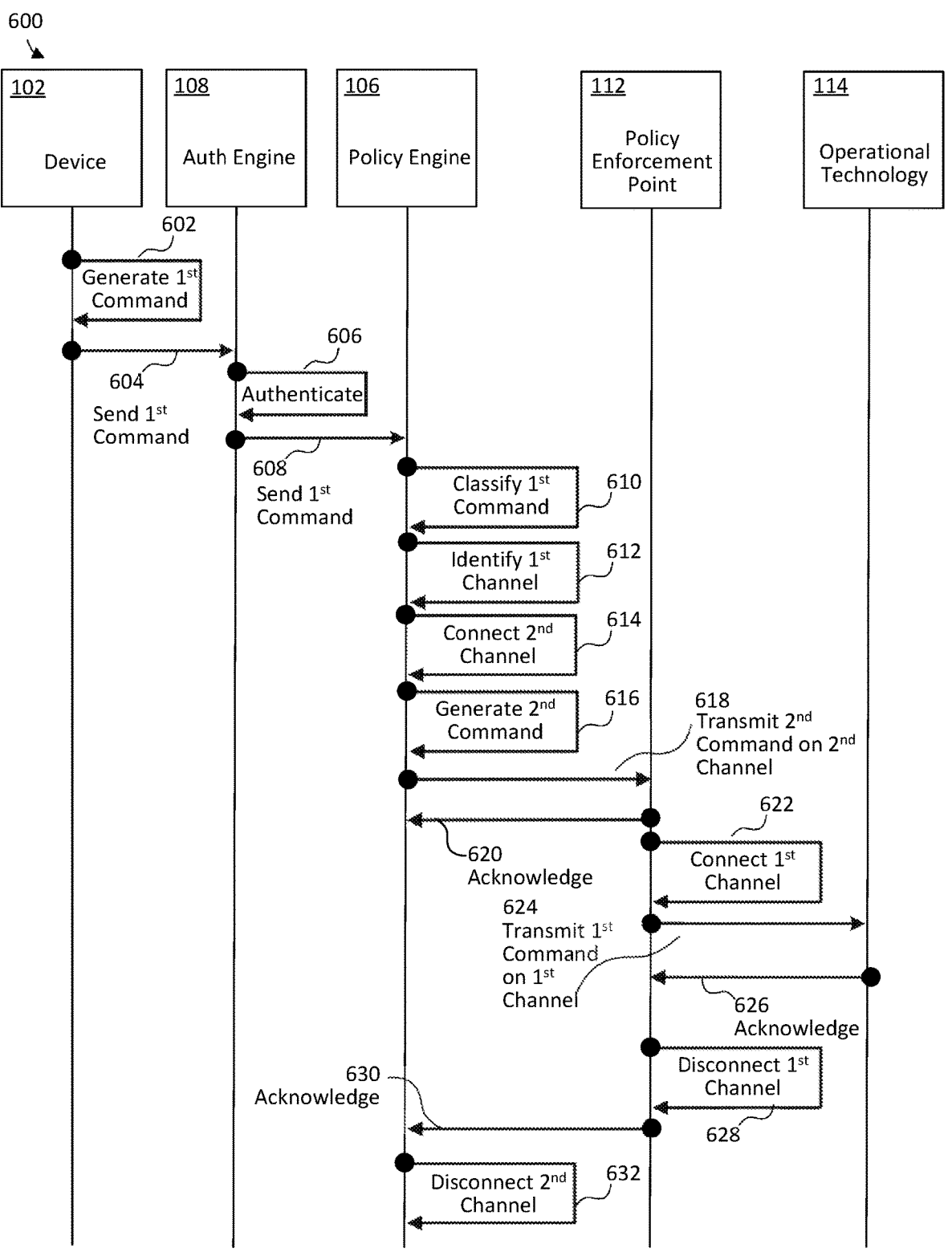
FIG. 6 illustrates a sequence diagram showing the steps and interactions associated with a computer implemented method, in accordance with embodiments of the present technology.

FIG. 6 illustrates sequence diagram 600 showing the process and interconnectivity of an example embodiment of dynamic attribute-based edge-deployed security. Sequence diagram 600 includes device 102, authentication engine 108, policy engine 106, policy enforcement point 112, and operational technology 114. Device 102, authentication engine 108, policy engine 106, policy enforcement point 112, and operational technology 114 are the same as illustrated in the preceding figures and are described in greater detail above.

At step 602, device 102 generates a first command executable relevant to operational technology 114. The command may include, for example, an instruction to halt performance of a task of an operational technology (e.g., operational technology 114), an instruction to begin performance of a task of an operational technology, an instruction to modify a security policy relevant to the operational technology, or other instructions relevant to the administration and function of an industrial automation environment.

At step 604, the first command is transmitted to intermediary 104, and more specifically to authentication engine 108. Transmission of the first command to the intermediary occurs over a communication channel that may be in local area network (LAN), a cloud-based network, or by any sufficient means of network communication. Link 116 of FIG. 1 is generally representative of such sufficient means of network communication.

At step 606, authentication engine 108 authenticates the access account associated with the command. Authentication may include validating the access account, identifying a set of credentials associated with the account, and the like. At step 608, upon authenticating the access account, authentication engine 108 sends the first command to policy engine 106. In some embodiments, policy engine 106 resides in intermediary 104 with authentication engine 108. In other embodiments, policy engine 106 resides on premises in the industrial automation environment 110.

At step 610, policy engine 106 classifies the first command as approved or denied. Classification of a command as approved or denied is described with greater detail above, particularly in FIG. 2 and the associated text.

At step 612, policy engine 106 identifies a first channel. The first channel connects operational technology 114 and policy enforcement point 112 such that messages can be transmitted to operational technology 114 from policy enforcement point 112 and vice versa. The first channel may be in local area network (LAN), a cloud-based network, or by any other sufficient means of network communication.

At step 614, policy engine 106 identifies and connects a second channel. The second channel connects policy engine 106 and policy enforcement point 112. The second channel may be in local area network (LAN), a cloud-based network, or by any other sufficient means of network communication.

At step 616, policy engine 106 generates a second command that includes an indication of the first channel and the first command. The indication of the first channel informs the policy enforcement point 112 which paths should be connected for the first communication channel to support execution of the approved command.

At step 618, policy engine 106 transmits the second command via the second channel. Note that where a command is classified as denied by policy engine 106, no second command is generated.

At step 620 of this embodiment, policy enforcement point 112 returns an acknowledgement upon reception of the transmission. In other embodiments, no acknowledgement is returned until after communication between policy enforcement point 112 and operational technology 114 commences or ends. In some embodiments, no acknowledgement is returned. Return of an acknowledgement is an indication of success by the recipient of a message or the performer of a task. The return of an acknowledgement promotes the ability to condition subsequent events on the successful reception of a message or execution of a task.

At step 622, policy enforcement point 112 connects the first communication channel. This connects policy enforcement point 112 and operational technology 114 such that the approved command can be transmitted to the operational technology for execution.

At step 624, policy enforcement point 112 transmits the first command to operational technology 114 via the first communication channel. In some embodiments, the first command issued by device 102 is not transmitted but instead other information may be sent or requested from operational technology 114.

At step 626, operational technology 114 returns an acknowledgement to policy enforcement point 112 that the message was received, the command was executed, or the like.

At step 628, policy enforcement point 112 may disconnect the first channel in response to the acknowledgement. In some embodiments, policy enforcement point 112 may disconnect the first channel upon expiration of a time delay. In some embodiments, other triggers for disconnecting the first channel may be used.

At step 630, policy enforcement point 112 returns an acknowledgement to policy engine 106. In some embodiments, no acknowledgement is returned, or the acknowledgement may be returned at a different place in the flow.

At step 632, policy engine 106 disconnects the second channel. In some embodiments, policy enforcement point 112 may disconnect the second channel. Disconnecting the second channel may be in response to acknowledgements other events. For example, the second channel may be disconnected based on receiving an acknowledgement from policy enforcement point 112, receiving an acknowledgement from operational technology 114, or upon expiration of a predetermined time delay. In other embodiments, no acknowledgement is returned by operational technology 114. In yet another embodiment, no acknowledgement is returned from policy enforcement point 112 to policy engine 106 upon receiving an acknowledgement from operational technology 114. Whether acknowledgements, predetermined time delays, or the like are used, the first communication channel and the second communication channel are disconnected to return the system 100 to a default zero-trust state.

Throughout this disclosure, communication channels are discussed as including dynamic paths. In addition to the dynamic paths, the communication channels may be established as secure communication channels, using encryption and other securing technologies and protocols to further enhance security.

FIG. 7 illustrates a user interface 700 of a network security system in an embodiment. In an embodiment, a device such as device 102 renders network security system communication portal 702 such that a user can interact with the network security system of the industrial automation environment. Network security system communication portal 702 includes a heading for a current access account display 726, a current access account display 704, a heading for a command history for access account display 706, a command history for access account display 708, a heading for a current operational technology status display 710, a current operational technology status display 712, a heading and instructions for a type command below input box 714, a type command below input box 716, a "Go" button 718, a "simulate" button 720, a heading for an expected outcome upon entry of command above display 722, and an expected outcome upon entry of command above display 724.

Heading for a current access account display 726 and current access account display 704 illustrate for the user which account is currently logged in, allowing the user to verify the access account that will be associated with any commands the user generates. Heading for a current access account display 726 could be displayed textually, pictographically, or by any other sufficient form of visual communication.

Heading for a command history for access account display 706 and command history for access account display 708 illustrate for the user a history of commands for the current access account and their respective classification as approved or denied. This allows the user to review recent commands and their classification, helping inform subsequent command entries of the user. When a user notices a particular command was classified as denied, they may adjust future similar commands to avoid denial as required. Heading for a command history for access account display 706 could be displayed textually, pictographically, or by any other sufficient form of visual communication.

Heading for a current operational technology status display 710 and current operational technology status display 712 illustrate for the user the current status of relevant operational technology (e.g., operational technology 114). This allows the user to evaluate the current condition of operational technology, helping inform subsequent command entries of the user relevant to that operational technology. Where a user notices an operational technology is, for example, occupied by the performance of a critical task, or in another example, halted for maintenance, the user will adjust future commands relevant to the operational technology to avoid denial as required. Heading for a current operational technology status display 710 could be displayed textually, pictographically, or by any other sufficient form of visual communication.

Heading and instructions for a type of command below input box 714, type command below input box 716, "Go" button 718, and "Simulate" button 720 give a user the ability to enter a potential command for submission to an industrial automation environment, to submit the command, and to simulate the outcome of the command. Entry of a command into type command below input box 716 and selection of "Go" button 718 will submit the given command to the industrial automation environment, at which point it will be intercepted by an intermediary (e.g., intermediary 104). Entry of a command and selection of "Simulate" button 720 will submit the command for processing by an intermediary, but not for actual classification. Instead, selecting "Simulate" button 720 generates an anticipated outcome from the command. Advantageously, this allows a user to predict the approval or denial of a given command, and where approved, to predict the effects of executing the command on operational technology.

Heading for an expected outcome upon entry of command above display 722 and expected outcome upon entry of command above display 724 illustrate for the user the anticipated outcome of the command entered into type command below input box 716. An anticipated outcome of a given command may include the classification of the command as approved or denied and the predicted effect of executing the command relevant operational technology. This allows a user to compare their prospective command and the output they envision with a simulated output to confirm the command is structured appropriately. Advantageously, this reduces the amount of downtime from an errant command, as a user can efficiently input a command and review the outcome of the command without effecting any changes in the actual industrial automation environment. Heading for an expected outcome upon entry of command above display 722 could be displayed textually, pictographically, or by any other sufficient form of visual communication.

In use, a access account of a user interacting with network security system communication portal 702 is displayed in current access account display 704. A access account is a parameter for determining a security policy to apply and is displayed on network security system communication portal 702 such that a user can verify the account they have logged in under. Command history for access account display 708 shows previous commands associated with the access account currently logged in. Review of command history for access account display 708 allows a user to further verify that they have logged in under the correct credentials by checking the previous commands recorded for the access account. Current operational technology status display 712 adds context to a user's interaction with a network security system of an industrial automation environment by displaying current operational technology status. Display of the status of operational technology status may provide additional reasoning for a particular consequence of a command, classification as denied or approved, or other response. The extent of detail provided by current operational technology status display 712 may be impacted by the degree of authority the credentials associated with the access account carries. A access account associated with a high degree of authority may be given detail about an operational technology that security policies dictate should not be displayed in response to a status request from a access account associated with a low degree of authority.

Type command below input box 716 allows a user to write and modify their command before submitting the command for execution. "Go" button 718, when selected, submits the command currently typed in type command below input box 716 for execution, where the command is then intercepted by the intermediary as described in various embodiments above. The "simulate" button, when selected, submits the command currently typed in type command below input box 716 and replicates command in simulation such that the anticipated outcome of the commands actual submission for execution is displayed in expected outcome upon entry of command above display 724. Here, similarly to the limitations that govern what information current operational technology status display 712 may provide for a user, the NSS will only provide a user with simulation data that is within that user's authority to execute.

Figure 8:
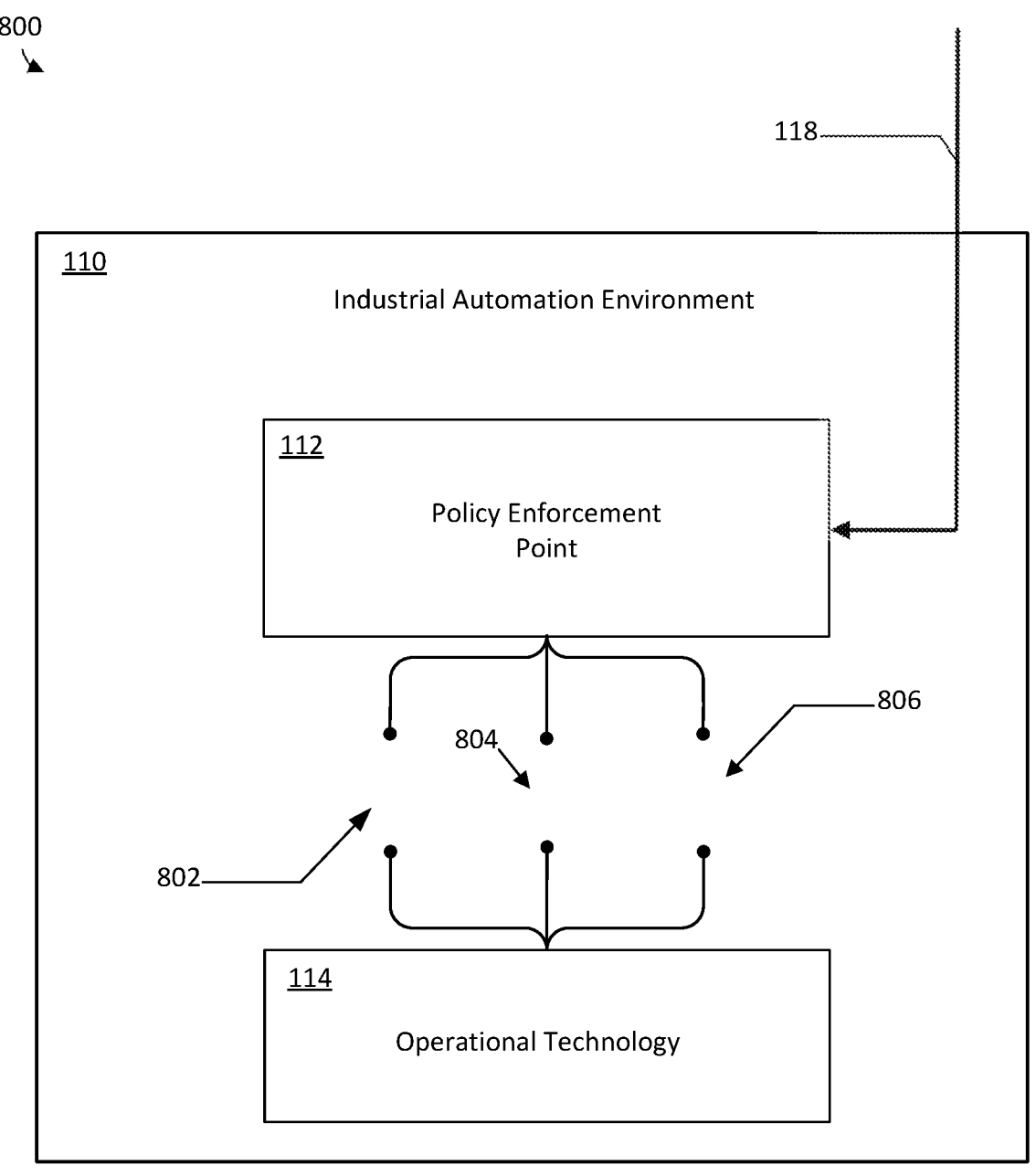
FIG. 8 illustrates an industrial automation environment in greater detail, in accordance with embodiments of the present technology.

FIG. 8 illustrates industrial automation environment 110 in greater detail 800. Industrial automation environment 110 in greater detail 800 includes industrial automation environment 110 of system 100 and second communication channel 118 of system 100. Industrial automation environment 110 and second communication channel 118 are discussed in greater detail above. Industrial automation environment 110 in greater detail 800 further includes dynamic first channel 802, dynamic first channel 804, and dynamic first channel 806.

In some embodiments of the technology disclosed herein, first communication channel 120 (see FIG. 1) is a static communication channel. In other embodiments, first communication channel 120 may be dynamic. Where first communication channel 120 is static, the same path for the first communication channel is to be used each time it is connected. Where first communication channel 120 is dynamic, the path used to connect policy enforcement point 112 and operational technology 114 is subject to change. In such embodiments, communication channel identification engine 214 (see FIG. 2) tracks the dynamic channels between policy enforcement point 112 and operational technology 114 such that when an approved command is received, communication channel identification engine 214 can pass an accurate and up to date indication of the path to use for the first communication channel to communication module 222. Timing intervals for dynamic channel availability can be based on predetermined values or can be adaptively assigned based on load management or other needs. For example, where a dynamic channel schema is used, communication between policy enforcement point 112 and operational technology 114 of industrial automation environment 110 may be facilitated by dynamic first channel 802, dynamic first channel 804, and dynamic first channel 806. In such an example three different channels can independently connect policy enforcement point 112 and operational technology 114. In some examples, only one of dynamic first channel 802, dynamic first channel 804, or dynamic first channel 806 may be connected as a communication channel on which messages may be transmitted to operational technology 114. In other examples, more than one of dynamic first channel 802, dynamic first channel 804, or dynamic first channel 806 may be available to connect as a communication channel. Advantageously, by obscuring which of the existing channels may be used to communicate with operational technology 114, system 100 benefits from a further layer of security that protects operational technology 114 from unauthorized external access based on the randomness in the paths used to facilitate a given communication channel at any given time. Further, in addition to obscuring the one or more connectable channels from the channels that cannot be used, the one or more connectable channels are subject to change at a predetermined interval, at random intervals, or in response to particular events. The rate at which the connectable channel changes from one existing channel to another, or in response to what events the instantiable channel changes, may be determined by an administrator and implemented by programming or an application stored on policy enforcement point 112, policy engine 106, or any suitable remote storage location. An event that may cause one path to be used over another may include, for example, when a given path is already being used by another process. For example, a branch of dynamic first channel 802 may be used by a different process. Accordingly, dynamic first channel 802 may not be selected for the path for the command to avoid network instability, introducing delay into the existing process, and the like. Advantageously, where application code dictating which of dynamic first channel 802, dynamic first channel 804, and dynamic first channel 806 may be instantiated is stored away from policy enforcement point 112, a bad actor seeking to disrupt industrial automation environment 110 by maliciously attacking operational technology 114 via policy enforcement point 112 will be left guessing which of the existing channels is available for use and to connect versus which channels are not available to be connected.

In use, a command classified as approved is transmitted from policy engine 106 to policy enforcement point 112 of industrial automation environment 110. Policy enforcement point 112 and operational technology 114 are connected by dynamic first channel 802, dynamic first channel 804, and dynamic first channel 806. In some embodiments, during a first time period, only dynamic first channel 802 is available for instantiation, during a second time period, only dynamic first channel 804 is available for instantiation, and during a third time period, only dynamic first channel 806 is available for instantiation. Depending on which predetermined interval the command is received during, policy enforcement point 112 will connect one of dynamic first channel 802, dynamic first channel 804, and dynamic first channel 806 in order to transmit the command to operational technology 114. If for example, the command was received at policy enforcement point 112 during the first time period, only dynamic first channel 802 is available to be connected. As a result, policy enforcement point 112 connects dynamic first channel 802 and transmits the command. In some embodiments, all three of dynamic first channel 802, 804, and 806 are available at any given time, and one is randomly selected for connection. In some embodiments, traffic analysis or known processes utilizing portions of the paths of dynamic first channels 802, 804, and 806 may be used to select an unused or lightly loaded channel. In some embodiments, messages may be divided into varying size pieces. In such an example, different pieces of the message may be sent at different intervals across different dynamic channels to further ensure that only communications from authorized sources with access to the dynamic channel protocol and scheduling are capable of delivering messages to operational technology 114.

FIG. 9 illustrates computing system 905. Computing system 905 is generally representative of a device such as device 102, intermediary 104, or a server on which policy engine 106, authentication engine 108, or policy enforcement point 112 are served from. Computing system 905 is representative of any system or collection of systems with which the various operational architectures, processes, scenarios, and sequences disclosed herein for implementation of a network security system in an industrial automation environment may be employed. Computing system 905 may be implemented as a single apparatus, system, or device or may be implemented in a distributed manner as multiple apparatuses, systems, or devices. Computing system 905 includes, but is not limited to, processing system 925, storage system 910, software 915, communication interface system 920, and user interface system 930. Processing system 925 is operatively coupled with storage system 910, communication interface system 920, and user interface system 930. Software 915 may further include instructions, that when executed, cause the processor to render a user interface, such as network security system communication portal 702 of FIG. 7. Policy engine 106 is representative of such instructions. Computing system 905 may be representative of a cloud computing device, distributed computing device, or the like.

Processing system 925 loads and executes software 915 from storage system 910. Software 915 includes and implements policy engine 106 as one example. Other software 915 may include authentication engine 108, policy enforcement point 112, and the like. Other software may be included that generates and implements user interaction via user interfaces, which is representative of any of user interface described in the preceding figures. When executed by processing system 925, software 915 directs processing system 925 to operate as described herein for at least the various processes, operational scenarios, and sequences discussed in the foregoing implementations. Computing system 905 may optionally include additional devices, features, or functionality not discussed for purposes of brevity.

Processing system 925 may comprise a micro-processor and other circuitry that retrieves and executes software 915 from storage system 910. Processing system 925 may be implemented within a single processing device but may also be distributed across multiple processing devices or subsystems that cooperate in executing program instructions. Examples of processing system 925 include general purpose central processing units, graphical processing units, application specific processors, and logic devices, as well as any other type of processing device, combinations, or variations thereof.

Storage system 910 may comprise any computer readable storage media readable by processing system 925 and capable of storing software 915. Storage system 910 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations, storage system 910 may also include computer readable communication media over which at least some of software 915 may be communicated internally or externally. Storage system 910 may be implemented as a single storage device but may also be implemented across multiple storage devices or sub-systems co-located or distributed relative to each other. Storage system 910 may comprise additional elements, such as a controller capable of communicating with processing system 925 or possibly other systems.

Software 915 may be implemented in program instructions and, when executed by processing system 925, can direct processing system 925 to operate as described with respect to the various operational scenarios, sequences, and processes illustrated herein. For example, software 915 may include program instructions for implementing the dynamic attribute based edge-deployed security of method 500. Further, the functionality described with respect to authentication engine 108, policy engine 106, policy enforcement point 112, intermediary 104, device 102, or the like may be implemented as instructions in software 915 for execution by processing system 925.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 915 may include additional processes, programs, or components, such as operating system software, virtualization software, or other application software. Software 915 may also comprise firmware or some other form of machine-readable processing instructions executable by processing system 925.

In general, software 915 may, when loaded into processing system 925 and executed, transform a suitable apparatus, system, or device (of which computing system 905 is representative) overall from a general-purpose computing system into a special-purpose computing system customized to provide edge-deployed security policy configuration as described herein. Indeed, encoding software 915 on storage system 910 may transform the physical structure of storage system 910. The specific transformation of the physical structure may depend on various factors in different implementations of this description. Examples of such factors may include, but are not limited to, the technology used to implement the storage media of storage system 910 and whether the computer-storage media are characterized as primary or secondary storage, as well as other factors.

For example, if the computer readable storage media are implemented as semiconductor-based memory, software 915 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 920 may include communication connections and devices that allow for communication with other computing systems (not shown) over communication networks (not shown). Examples of connections and devices that together allow for inter-system communication may include network interface cards, antennas, power amplifiers, radiofrequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 905 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of networks, or variation thereof. The aforementioned communication networks and protocols are well known and need not be discussed at length here.

While some examples provided herein are described in the context of an industrial automation environment, it should be understood that the network security systems and methods described herein are not limited to such embodiments and may apply to a variety of other automation environments and their associated systems. As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A computer-implemented method comprising:
   receiving, by a policy engine, a first command executable in an industrial automation environment, wherein the first command is received via an access account, and wherein the first command is relevant to an operational technology in the industrial automation environment;
   classifying, by the policy engine, the first command as one of approved or denied, wherein the classifying comprises:
      identifying a security policy based at least in part on the access account and the operational technology,
      determining a set of parameter values based on the identified security policy,
      determining an intent of the first command based on the set of parameter values, and
      selecting the classification based on evaluating the intent of the first command against the identified security policy; and
   in response to the first command being classified as approved:
      identifying, by the policy engine, a first communication channel to connect between a policy enforcement point and the operational technology,
      connecting a different second communication channel, upon satisfaction of the identified security policy, between the policy engine and the policy enforcement point, and
      transmitting a different second command comprising the approved first command and an indication of the first communication channel to the policy enforcement point via the second communication channel.

2. The computer-implemented method of claim 1, wherein a default state of the industrial automation environment is a state in which no communication channel is connected between the policy enforcement point and the operational technology.

3. The computer-implemented method of claim 1, wherein the first command comprises a natural language instruction, the method further comprising:
   applying a natural language processing model to the first command, wherein the natural language processing model is trained to extract command information from the natural language instruction, and wherein the command information comprises at least an identification of the operational technology; and
   receiving the command information at the policy engine.

4. The computer-implemented method of claim 1, wherein the parameter values include an identity of a user associated with the access account, a role of the user, a location of the user, a current activity of the user, a preceding activity of the user, a historical record of activity of the user, an identity of a system associated with the access account, a role of the system, a time of the command to be executed, a date of the command to be executed, a nature of the command to be executed, or a combination thereof.

5. The computer-implemented method of claim 1, wherein determining the intent of the first command comprises:

providing, to an artificial intelligence system, an input comprising the first command and the set of parameter values, wherein the artificial intelligence system is trained to provide an output comprising the intent based on evaluating the input;

receiving the output from the artificial intelligence system; and identifying the intent from the output.

6. The computer-implemented method of claim 1, wherein the first command comprises one of:

an operation for execution by the operational technology; and modification of a second security policy relevant to the operational technology.

7. The computer-implemented method of claim 1, wherein:

the operational technology is a first operational technology of a plurality of operational technology;

the first command is relevant to the plurality of operational technology;

the classifying the first command as one of approved or denied comprises classifying the first command against each operational technology of the plurality of operational technology, the classifying comprising:

for each operational technology of the plurality of operational technology:

identifying a security policy for the respective operational technology based at least in part on the access account and the respective operational technology, determining a set of parameter values based on the security policy, determining an intent of the command based on the set of parameter values, and selecting the classification of the command against the respective operational technology based on evaluating the intent of the first command against the security policy; and for each operational technology of the plurality of operational technology, wherein the first command relevant to a first subset of operational technology of the plurality of operational technology is classified as approved and the first command relevant to a second subset of operational technology of the plurality of operational technology is classified as denied:

in response to the first command relevant to the respective operational technology being classified as approved:

identifying, by the policy engine, an additional communication channel to connect between the policy enforcement point and the respective operational technology, and adding an indication of the additional communication channel to a list of communication channels, wherein the different second command comprises the list of communication channels; and in response to the first command relevant to the respective operational technology being classified as denied:

not adding the indication of the additional communication channel to the list of communication channels.

8. The computer-implemented method of claim 1, wherein the first communication channel comprises a dynamically generated path.

9. The computer-implemented method of claim 1, further comprising:

closing the second communication channel in response to one of:

transmitting the different second command to the policy enforcement point;

receiving an acknowledgement from the policy enforcement point;

receiving an acknowledgement that the command was executed relevant to the operational technology;

upon expiration of a predetermined time; or a combination thereof.

10. A network security system, comprising:

one or more processors; and one or more memories having stored thereon instructions that, upon execution by the one or more processors, cause the one or more processors to:

receive, by a policy engine of the network security system, a first command executable in an industrial automation environment, wherein the first command is received via an access account, and wherein the first command is relevant to an operational technology in the industrial automation environment, classify, by the policy engine, the first command as one of approved or denied, wherein the instructions to classify comprises further instructions that, upon execution by the one or more processors, cause the one or more processors to:

identify a security policy based at least in part on the access account and the operational technology;

determine a set of parameter values based on the identified security policy;

determine an intent of the first command based on the set of parameter values; and select the classification based on evaluating the intent of the first command against the identified security policy, and in response to the first command being classified as approved:

identify, by the policy engine, a first communication channel to connect between a policy enforcement point and the operational technology, connect a different second communication channel, upon satisfaction of the identified security policy, between the policy engine and the policy enforcement point, transmit a different second command comprising the approved first command and an indication of the first communication channel to the policy enforcement point via the second communication channel, and closing the second communication channel after transmitting the second command.

11. The network security system of claim 10, wherein a default state of the industrial automation environment is a state in which no communication channel is connected between the policy enforcement point and the operational technology.

12. The network security system of claim 10, wherein:

the first command comprises a natural language instruction, and the instructions comprise further instructions that, upon execution by the one or more processors, cause the one or more processors to:

apply a natural language processing model to the first command, wherein the natural language processing model is trained to extract command information from the natural language instruction, and wherein the command information comprises at least an identification of the operational technology, and receive the command information at the policy engine.

13. The network security system of claim 10, wherein the parameter values include an identity of a user associated with the access account, a role of the user, a location of the user, a current activity of the user, a preceding activity of the user, a historical record of activity of the user, an identity of a system associated with the access account, a role of the system, a time of the command to be executed, a date of the command to be executed, a nature of the command to be executed, or a combination thereof.

14. The network security system of claim 10, wherein the instructions to determine the intent comprises further instructions that, upon execution by the one or more processors, cause the one or more processors to:

provide, to an artificial intelligence system, an input comprising the first command and the set of parameter values, wherein the artificial intelligence system is trained to provide an output comprising the intent based on evaluating the input;

receiving the output from the artificial intelligence system; and identifying the intent from the output.

15. The network security system of claim 10, wherein:

the operational technology is a first operational technology of a plurality of operational technology;

the first command is relevant to the plurality of operational technology;

the instructions to classify the first command as one of approved or denied comprises further instructions that, upon execution by the one or more processors, cause the one or more processors to:

for each operational technology of the plurality of operational technology:

identify a security policy for the respective operational technology based at least in part on the access account and the respective operational technology, determine a set of parameter values based on the security policy, determine an intent of the first command based on the set of parameter values, and select the classification of the first command against the respective operational technology based on evaluating the intent of the first command against the security policy; and for each operational technology of the plurality of operational technology, wherein the first command relevant to a first subset of operational technology of the plurality of operational technology is classified as approved and the first command relevant to a second subset of operational technology of the plurality of operational technology is classified as denied:

in response to the first command relevant to the respective operational technology being classified as approved:

identify, by the policy engine, an additional communication channel to connect between the policy enforcement point and the respective operational technology, and add an indication of the additional communication channel to a list of communication channels, wherein the different second command comprises the list of communication channels.

16. The network security system of claim 10, wherein the first communication channel comprises a dynamically generated path.

17. The network security system of claim 10, further comprising:

closing the second communication channel in response to one of:

transmitting the different second command to the policy enforcement point;

receiving an acknowledgement from the policy enforcement point;

receiving an acknowledgement that the first command was executed relevant to the operational technology;

upon expiration of a predetermined time; or a combination thereof.

18. A computer-implemented method comprising:

receiving, at a policy enforcement point of an industrial automation environment via a first communication channel between the policy enforcement point and a policy engine, an approved first command, wherein:

the approved first command comprises a different second command executable relevant to an operational technology and an indication of a different second communication channel to connect between the policy enforcement point and the operational technology, the approved first command is approved by the policy engine based at least on an intent and a security policy, and the security policy is identified by the policy engine based at least on an access account and the operational technology;

connecting the second communication channel, as indicated in the approved first command, between the policy enforcement point and the operational technology, upon satisfaction of the identified security policy;

transmitting the second command to the operational technology via the second communication channel; and closing the second communication channel between the policy enforcement point and the operational technology after transmitting the second command.

19. The computer-implemented method of claim 18, wherein a default state of the industrial automation environment is a state in which no communication channel is connected between the policy enforcement point and the operational technology.

20. The computer-implemented method of claim 18, wherein the closing the second communication channel is in response to one of:

receiving an acknowledgement that the first command was executed relevant to the operational technology;

upon expiration of a predetermined time; or a combination thereof.

\* \* \* \* \*